United States Patent
Zarkh et al.

(10) Patent No.: US 7,742,629 B2
(45) Date of Patent: Jun. 22, 2010

(54) SYSTEM AND METHOD FOR THREE-DIMENSIONAL RECONSTRUCTION OF A TUBULAR ORGAN

(75) Inventors: Michael Zarkh, Giv'at Shmuel (IL); Moshe Klaiman, Gedera (IL)

(73) Assignee: Paieon Inc., New York, NY (US)

( * ) Notice: Subject to any disclaimer, the term of this patent is extended or adjusted under 35 U.S.C. 154(b) by 927 days.

(21) Appl. No.: 10/573,464

(22) PCT Filed: Sep. 24, 2004

(86) PCT No.: PCT/US2004/031594
§ 371 (c)(1),
(2), (4) Date: Mar. 24, 2006

(87) PCT Pub. No.: WO2005/031635
PCT Pub. Date: Apr. 7, 2005

(65) Prior Publication Data
US 2007/0116342 A1 May 24, 2007

Related U.S. Application Data

(60) Provisional application No. 60/505,430, filed on Sep. 25, 2003, provisional application No. 60/506,178, filed on Sep. 29, 2003, provisional application No. 60/577,981, filed on Jun. 7, 2004.

(51) Int. Cl.
*G06K 9/00* (2006.01)
*G06K 9/36* (2006.01)

(52) U.S. Cl. .................. 382/128; 382/154; 382/285; 345/419; 356/12; 348/42

(58) Field of Classification Search ......... 382/128–132, 382/154, 285; 345/419–427; 356/12–14; 348/42–60
See application file for complete search history.

(56) References Cited

U.S. PATENT DOCUMENTS 4,263,916 A 4/1981 Brooks et al.
(Continued)

FOREIGN PATENT DOCUMENTS

DE 100 47 314 4/2001
(Continued)

OTHER PUBLICATIONS

Penney G P et al "A Comparison of Similarity Measures for Use in 2-D-3-D Medical Image Registration" IEEE Transactions on Medical Imaging, IEEE Service Center, Piscataway, NJ, US, vol. 17 ,No. 4. pp. 586-595, 1998.
(Continued)

*Primary Examiner*—Aaron W Carter
(74) *Attorney, Agent, or Firm*—Mintz, Levin, Cohn, Ferris, Glovsky and Popeo, P.C.

(57) ABSTRACT

Embodiments of the present invention include methods and systems for three-dimensional reconstruction of a tubular organ (for example, coronary artery) using a plurality of two-dimensional images. Some of the embodiments may include displaying a first image of a vascular network, receiving input for identifying on the first image a vessel of interest, tracing the edges of the vessel of interest including eliminating false edges of objects visually adjacent to the vessel of interest, determining substantially precise radius and densitometry values along the vessel, displaying at least a second image of the vascular network, receiving input for identifying on the second image the vessel of interest, tracing the edges of the vessel of interest in the second image, including eliminating false edges of objects visually adjacent to the vessel of interest, determining substantially precise radius and densitometry values along the vessel in the second image, determining a three dimensional reconstruction of the vessel of interest and determining fused area (cross-section) measurements along the vessel and computing and presenting quantitative measurements, including, but not limited to, true length, percent narrowing (diameter and area), and the like.

23 Claims, 17 Drawing Sheets

U.S. PATENT DOCUMENTS

| | | |
|---|---|---|
| 4,875,165 A | 10/1989 | Fencil et al. |
| 4,889,128 A | 12/1989 | Millar |
| 5,124,914 A | 6/1992 | Grangeat |
| 5,175,773 A | 12/1992 | Bouliou et al. |
| 5,203,777 A | 4/1993 | Leeq |
| 5,207,226 A | 5/1993 | Bailin et al. |
| 5,309,356 A | 5/1994 | Nishide et al. |
| 5,357,550 A | 10/1994 | Asahina et al. |
| 5,446,800 A | 8/1995 | Briggs et al. |
| 5,481,653 A | 1/1996 | Kashiwagi et al. |
| 5,583,902 A | 12/1996 | Bae |
| 5,647,360 A | 7/1997 | Bani-Hashemi et al. |
| 5,671,265 A | 9/1997 | Andress |
| 5,699,799 A | 12/1997 | Xu et al. |
| 5,718,724 A | 2/1998 | Goicoechea et al. |
| 5,729,129 A | 3/1998 | Acker |
| 5,732,707 A | 3/1998 | Widder et al. |
| 5,734,384 A | 3/1998 | Yanof |
| 5,833,607 A | 11/1998 | Chou et al. |
| 5,840,025 A | 11/1998 | Ben Haim |
| 5,872,861 A | 2/1999 | Makram-Ebeid |
| 5,912,945 A | 6/1999 | Da Silva et al. |
| 5,978,439 A | 11/1999 | Koppe et al. |
| 6,027,460 A | 2/2000 | Shturman |
| 6,047,080 A | 4/2000 | Chen et al. |
| 6,088,488 A | 7/2000 | Hardy et al. |
| 6,094,591 A | 7/2000 | Foltz et al. |
| 6,148,095 A | 11/2000 | Prause et al. |
| 6,167,296 A | 12/2000 | Shahidi |
| 6,169,917 B1 | 1/2001 | Masotti et al. |
| 6,190,353 B1 | 2/2001 | Makower et al. |
| 6,195,450 B1 | 2/2001 | Qian et al. |
| 6,195,577 B1 | 2/2001 | Truwit et al. |
| 6,233,476 B1 | 5/2001 | Strommer et al. |
| 6,246,898 B1 | 6/2001 | Vesly et al. |
| 6,249,695 B1 | 6/2001 | Damadian |
| 6,290,673 B1 | 9/2001 | Shanley |
| 6,301,498 B1 | 10/2001 | Greenberg et al. |
| 6,317,621 B1 | 11/2001 | Graumann et al. |
| 6,324,254 B1 | 11/2001 | Pflaum |
| 6,332,034 B1 | 12/2001 | Makram-Ebeid et al. |
| 6,334,864 B1 | 1/2002 | Amplatz et al. |
| 6,351,513 B1 | 2/2002 | Bani-Hashemi et al. |
| 6,381,350 B1 | 4/2002 | Klingensmith et al. |
| 6,385,332 B1 | 5/2002 | Zahalka et al. |
| 6,389,104 B1 | 5/2002 | Bani-Hashemi et al. |
| 6,404,850 B1 | 6/2002 | Horbaschek et al. |
| 6,463,309 B1 | 10/2002 | Ilia |
| 6,501,848 B1 | 12/2002 | Carroll et al. |
| 6,503,203 B1 | 1/2003 | Rafter et al. |
| 6,505,064 B1 | 1/2003 | Liu et al. |
| 6,510,241 B1 | 1/2003 | Vailant et al. |
| 6,535,756 B1 | 3/2003 | Simon et al. |
| 6,544,230 B1 | 4/2003 | Flaherty et al. |
| 6,546,271 B1 | 4/2003 | Reisfeld |
| 6,549,607 B1 | 4/2003 | Webber |
| 6,614,871 B1 | 9/2003 | Kobiki et al. |
| 6,709,444 B1 | 3/2004 | Makower |
| 6,748,259 B1 | 6/2004 | Benaron et al. |
| 6,754,522 B2 | 6/2004 | Keren |
| 6,990,368 B2 | 1/2006 | Simon et al. |
| 2002/0057825 A1 | 5/2002 | Evron et al. |
| 2003/0032886 A1 | 2/2003 | Dgany et al. |
| 2003/0199759 A1 | 10/2003 | Richard |
| 2004/0102697 A1 | 5/2004 | Evron |
| 2004/0136491 A1 | 7/2004 | Iatrou et al. |
| 2004/0171932 A1* | 9/2004 | Raman et al. ............... 600/425 |
| 2004/0260175 A1* | 12/2004 | Florent et al. ............... 600/424 |
| 2005/0113686 A1 | 5/2005 | Peckham |

FOREIGN PATENT DOCUMENTS

| | | |
|---|---|---|
| EP | 0 885 594 | 12/1998 |
| EP | 1 005 835 | 6/2000 |
| RU | 2119765 | 10/1988 |
| WO | WO 96 25881 | 8/1996 |
| WO | WO 99 13432 | 3/1999 |
| WO | WO 01 58359 | 8/2001 |
| WO | WO 01/85030 | 11/2001 |
| WO | WO 02/36013 | 5/2002 |
| WO | WO 03/105017 A2 | 12/2003 |
| WO | WO 03/096884 | 2/2004 |
| WO | WO 2005/008583 | 1/2005 |
| WO | WO 2005/020148 | 3/2005 |
| WO | WO 2005/031635 | 4/2005 |
| WO | WO 2006/033113 | 3/2006 |
| WO | WO 2006/061815 | 6/2006 |

OTHER PUBLICATIONS

Russakoff D B et al "Intensity-based 2D-3D spine image registration incorporating a single fiducial marker" Academic Radiology, Reston, VA, US, vol. 12, No. 1. pp. 37-50, 2004.

Srihari R et al "Image background search: combining object detection techniques with content-based image retrieval (CBIR) systems" Content-Based Access of Image and Video Libraries, 1999. (CBAIVL '99). Proceedings. IEEE Workshop on Fort Collins, CO, US, Los Alamitos, CA, USA,IEEE Comput. Soc, US, 1999, pp. 97-101.

Eiho S et al "Preoperative and intraoperative image processing for assisting endovascular stent grafting" Informatics Research for Development of Knowledge Society Infrastructure, 2004.ICKS 2004. International Conference on Kyoto, Japan Mar. 1-2, 2004, Piscataway, NJ, USA,IEEE. pp. 81-88.

Close R A et al "Accuracy Assessment of Layer Decomposition Using Simulated Angiographic Image Sequences" IEEE Transactions on Medical Imaging, IEEE Service Cente, Piscataway, NJ, US, vol. 20, No. 10. pp. 990-998, 2001.

Nelson T R et al "Three-dimensional ultrasound imaging" Ultrasound in Medicine and Biology, New York, NY, US, vol. 24, No. 9. pp. 1243-1270, 1997.

Bankman I "Handbook of Medical Imaging Progressing and Analysis" 2000, Academic Press, San Diego, London. pp. 359-374.

Garreau M et al. "A knowledge-based approach for 3-D reconstruction and labeling of vascular networks from biplane Angiographic projections" IEEE transactions on medical imaging, US, IEEE inc. vol. 10 , No. 2, 1991.

Zarkh M., Klaiman M., Maron H., "Three-Dimensional Reconstruction and Analysis of Coronary Vessels: the CardiOp-B System", Elsevier International Congress Series, vol. 1268, Jun. 23, 2004, p. 1367, XP002548355.

Kaupp A., et al., "Measuring Morphologic Properties of the Human Retinal Vessel System Using a Two-Stage Image Processing Approach", Proceedings of the International Conference on Image Processing (ICIP) Austin, Nov. 13-16, 1994, Los Alamitos, IEEE Comp. Soc. Press, US. vol. 1, Nov. 13, 1994 (pp. 431-435), XP010146068.

Kayikcioglu T., et al., "A Surface-Based Method for Detection of Coronary Vessel Boundaries in Poor Quality X-ray Angiogram Images", Pattern Recognition Letters, Elsevier, vol. 23, No. 7, May 1, 2002, pp. 783-802, XP004342292.

Supplementary European Search Report, EP No. 04785100.1, date of completion of search, Oct. 1, 2009.

\* cited by examiner

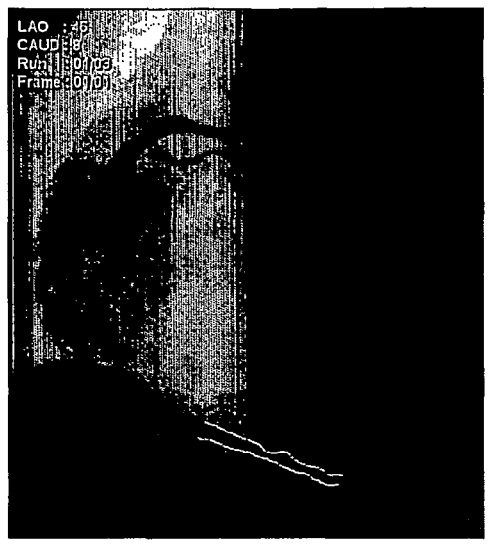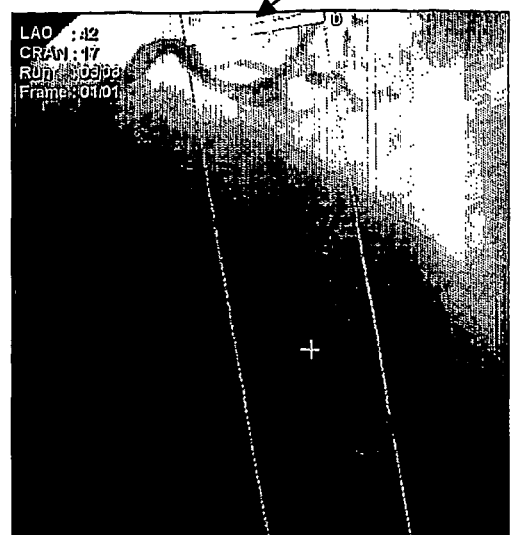
Fig. 35A
Fig. 35B
Epi-polar Proximal line 3510
Epi-polar Distal line 3520
Epi-polar map (bar) 3530

SYSTEM AND METHOD FOR THREE-DIMENSIONAL RECONSTRUCTION OF A TUBULAR ORGAN

CLAIMS TO PRIORITY AND RELATED APPLICATIONS

The present application claims priority under 35 U.S.C. §119(e) of U.S. provisional patent application Nos. 60/505,430, filed Sep. 25, 2003, 60/506,178, filed Sep. 29, 2003, and 60/577,981, filed Jun. 7, 2004, each disclosure of which, in its entirety, is incorporated herein by reference.

BACKGROUND OF THE INVENTION

1. Field of the Invention

The present invention relates to medical imaging systems, and more specifically to medical imaging systems for use in angiography, for example.

2. Background of the Invention

A stenosis in a blood vessel, for example, an artery refers to narrowing of the artery lumen due to plaque formation on the interior wall of the artery. The severity of the narrowing depends upon the amount of cross-sectional area of the lumen that is occluded by plaque. While narrowing of the arteries may occur in any artery of the body (e.g., carotid arteries), particular concern has been placed on investigating the narrowing of arteries of the heart, the coronary arteries (coronary heart disease), since narrowing of these arteries is one of the primary causes of heart attacks. Accordingly, coronary angiography refers to the process (and associated systems) of investigating coronary arteries to determine the severity of any narrowing (i.e., to find stenotic arteries) that may exist.

To image the arteries, a catheter is inserted into an artery of the arm or leg of a patient, where it is eventually advanced into the coronary arteries. Upon arriving at the coronary arteries, a radio-opaque substance is injected therein, so that the arteries may be imaged, using, for example, an X-ray angiography system.

The system takes "snapshots" (i.e., angiographic cine-runs) of the arteries at several different perspectives, to obtain complete views of the one or more arterial networks being investigated. Also, since narrowing is often asymmetrical about the axis of the artery, it is necessary to obtain at least two images, and preferably more, preferably perpendicular to an artery's axis from different perspectives (preferably orthogonal perspectives) to assess the severity of a stenosis. However, it is generally very difficult to obtain purely perpendicular perspectives of the vessels.

Accordingly, determination of the perspective positions is partially arbitrary and partially a process of trial and error (once a stenosis has been observed). However, the overall number of images that can be obtained is limited by time, safety and cost. Usually four to seven projections for the left coronary arterial system and two to four images for the right arterial system are obtained.

An operator of an angiography system assesses the severity of a stenosis in the coronary arteries either on the basis of visual examination of a plurality of images (projections) or by computer analysis of a single image. As indicated above, since most of the images are, in general, not purely perpendicular to the arterial axis, estimation of stenosis severity is usually not accurate by either means.

Currently, there exist two-dimensional (2D) Quantitative Coronary Angiography (QCA) systems, which create 2D images of vessels for the investigation of stenoses, as well as three-dimensional (3D) QCA methods which also create a 3D reconstruction (3DR) of an entire arterial tree for investigation of stenotic vessels.

The 2D QCA systems basically implement the following steps: import of a specific image, vessel extraction for this image and then QCA for the vessel of interest. 2D QCA systems usually provide diameter based analysis of the lesion and not densitometry analysis. In some cases, densitometry analysis is provided via the usage of DSA, but not for scenes that include motion, like the coronaries.

The 3D QCA methods generally include the following steps: image acquisition, vessel extraction from the 2D projections. The 3D QCA systems additionally include imaging geometry recovery, point-by-point matching (between images) and, of course, 3DR. The QCA of the 3D system generally includes, morphology assessment (including vessel foreshortening, overlapping, angulation, tortuosity), and in some cases measurements, usually true length and diameter information. However, cross-section area measurements are rarely addressed, although attempts have been made to achieve a precise representation of cross section profile along the vessels. A method based on some heuristics in a framework of algebraic reconstruction approach was suggested in U.S. Pat. No. 6,301,498 to Greenberg. However this method requires a special arrangement of at least four (4) acquisitions from different directions orthogonal to the artery.

Also, in both 2D and 3D QCA systems and methods, one important aspect of measurements and stenosis severity is the establishment of healthy vessel measurements. Systems and methods that present healthy vessel (or related) measurements use, for example, the interpolation of values based on measured diameters at proximal and at distal portions. This step is critical, since it is a basis for many measurements. At the same time, this step is very sensitive and could easily produce incorrect measurements.

Other problems exist with reference to the methods for the existing 3D imaging systems. For example, with image acquisition, prior art systems utilize either bi-plane acquisition, rotational acquisition, or single projection (image) acquisition (the most general approach (see U.S. Pat. Nos. 6,047,080 and 6,169,917). Although bi-plane acquisition minimizes distortions due to cardiac cycle phase, the technique is insufficient in some situations of epi-polar geometry ambiguity. With regard to rotational acquisition systems, although close in time, these systems do not solve either a cardiac phase problem or the epi-polar geometry ambiguity.

With regard to imaging geometry recovery, the number of control points needed for geometry recovery depends on the type of transformation that is found and assumptions on unknown parameters. Accordingly, the number of control points can range anywhere from five (5) (see, for example, U.S. Pat. Nos. 6,047,080 and 6,501,848) to eight (8) (see, for example, U.S. Pat. No. 4,875,165) for perspective transformation. However, the confident and accurate identification of at least five corresponding points on multiple images is a burdensome procedure, if at all possible, since, for example, the right coronary artery system often lacks adequate branching points.

Moreover, whether non-linear or linear optimization is used, both solutions suffer from an instability problem. Specifically, the natural candidate points to serve as control points are the branching points in the arterial tree. However, it is very often the case that the precise location of a branching point is difficult to identify due to that area of the arterial tree overlapping another vessel or itself Moreover, as usual in computational geometry, not every required set of points is useful to produce the transformation. For example, if all the points lie on a common line in an image, the points can not serve for transformation calculation. Finally, transformation to 3DR from a family of perspective transformations, in general, can not compensate for local distortions in each image caused by the image being taken at different phase of either the heart cycle and patient respiration (for example).

There also exist a variety of techniques for vessel extraction in prior art imaging systems from 2D X-ray angiographic images. However, the ability to perform vessel extraction in clinical practice relates to the degree of automation and robustness of a particular process. For example, in U.S. Pat. No. 6,047,080, an operator must input six (6) marking points to identify six (6) branches of an artery tree in each image, and make several clicks per branch to define an initial centerline of each branch in every image. In addition, in order to stabilize the solution, the operator is recommended to add control points of high curvature and add stenosis points.

When the centerlines representing the entire vascular tree (including various branches) in 2D projections have been extracted, point-by-point matching utilizes (e.g., for multiple images) the epi-polar principle. Epi-polar geometry is premised on the statement that for an imaged 3D point, its projections on a pair of images and two (2) associated focal points belong to a common (epi-polar) plane. Accordingly, for any given point on one image, the search for the corresponding point on another image may be found on the epi-polar line (intersection of the epipolar plane with the image plane). However, this approach yields sufficient results only if. (i) the imaging geometry model adequately relates the organ and its 2D image, and (ii) the imaged vessel does not change its shape between the image acquisitions. This is why, in clinical practice, the restrictions of the straightforward epi-polar geometry approach are very limiting in tenns of accuracy and quality of the 3D model.

In view of the above-mentioned short comings of the prior art, current 2D QCA systems do not deliver sufficient support for coronary angiography (for example) and current 3D QCA systems are not in clinical use since these systems either deliver incorrect results or are too cumbersome to use.

Thus, there exists a need for a 3DR system which can be used in clinical procedures (e.g., angiography) that delivers a system that may include a practical, intuitive, easy-to-use, robust solution to overcome at least one and preferably all of the above-mentioned disadvantages of the prior art systems and methods.

SUMMARY OF THE INVENTION

Accordingly, embodiments of the present invention overcome the drawbacks and problems associated with the prior art systems, and present simple to use and straight forward systems and methods for accurately imaging and creating a 3DR of a tubular organ which may be used with conventional X-ray angiography systems. Specifically, some embodiments of the present invention present methods and systems for 3DR of a single vascular structure of interest, using two (and in some embodiments, more than two), 2D X-ray images.

Briefly, some embodiments may include one or more (and, in some embodiments all) of the following: acquisition of cine-runs, projection angulation and ECG information (e.g., via Analog and/or DICOM), system calibration to process images (e.g., catheter calibration), marking of two or more images, edge tracing, with pre and post processing to eliminate potential incorrect distortions of the edge, detection of centerline, densitometry, including background subtraction, point-to-point matching and 3DR, fusion of diameter and densitometry data to obtain precise vessel cross-section area measurements, determination and visualization of healthy vessel proportions (in 2D and/or 3D), and display of data associated with the system, vessel of interest, and other S related data. With the present invention, the output of coronary angiography is improved by presenting a three-dimensional reconstruction of, for example, a stenotic vessel, as well as quantitative cross-section information.

In some embodiments, a three-dimensional reconstruction may be integrated into one display with information about the imaged vessel that is available from angiography. Moreover, the 3D reconstruction as presented by such embodiments may reveal the complete morphology of the vessel, including details that are unseen in the 2D images due to foreshortened and curved segments. In addition, a display of 2D or 3DR of a vessel of interest can be focused on, zoomed and rotated.

The tubular organ and vessel of interest may be any one of an artery, a vein, a coronary artery, a carotid artery, a pulmonary artery, a renal artery, a hepatic artery, a femoral artery, a mesenteric artery and the like (e.g., any other tubular organ).

Accordingly, in a first embodiment, a method for three-dimensional reconstruction (3DR) of a single tubular organ using a plurality of two-dimensional images is provided and may include one or more of the following steps: displaying a first image of a vascular network, receiving input for identifying on the first image a vessel of interest, tracing the edges of the vessel of interest including eliminating false edges of objects visually adjacent to the vessel of interest and determining substantially precise radius and densitometry values along the vessel. The method may also include one or more of the following steps: displaying at least a second image of the vascular network, receiving input for identifying on the second image the vessel of interest, tracing the edges of the vessel of interest in the second image, including eliminating false edges of objects visually adjacent to the vessel of interest, determining substantially precise radius and densitometry values along the vessel of interest in the second image, determining a three dimensional reconstruction of the vessel of interest and determining fused area measurements along the vessel. This embodiment may also include determining a centerline, which includes a plurality of centerline points.

The determination of the fused area may include determining a plurality of healthy diameters (and preferably all healthy diameters) along the vessel of interest to be used as a physical reference, normalizing a majority of the data (and preferably substantially all the data, and most preferably, all the data), e.g., diameters and cross-section values into physical units, using the physical reference, fusing a majority of the data (preferably all or substantially all) into single area measurements and weighting each source of data according to the reliability of the data. The weighting may be computed as a function of the views geometry and/or 3D vessel geometry.

The input for identifying the vessel of interest may include three points: a first point to mark the stenosis general location, a second point proximal to the stenosis, and a third point distal to the stenosis.

However, the input may also comprises markers for two (2) points for at least one of the first and second images, where one of the two points is anywhere proximal to the stenosis and the other point is anywhere distal to the stenosis. The markers may also comprise two (2) points for the first image and one (1) point for the second image, where one of the two points is anywhere proximal to the stenosis and the other point is anywhere distal to the stenosis and one point may be an anchor point identified automatically on the first image.

The elimination of false edges may comprise detecting of one or more "bubbles" (see description below) adjacent the vessel of interest. A novel embodiment for detecting such bubbles (e.g., false edges) may include defining a region of interest substantially parallel to a primary centerline, detecting at least one cluster of pixel data, adjacent to the vessel of interest, wherein each cluster of pixel data having a predetermined brightness level greater than a brightness level of surrounding pixel data, selecting an arbitrary pixel within each cluster, selecting a second pixel provided on a lane bounding the region of interest for each arbitrary pixel of each cluster, and establishing a barrier line to define an edge for the vessel of interest by connecting a plurality of arbitrary pixels with a corresponding second pixel. Upon the tracing each edge of the vessel of interest, the traced edge avoids each barrier line.

The elimination of false edges may also include detecting and/or eliminating (e.g., ignoring) one or more "bumps" along the vessel of interest. In particular, the elimination of false edges, with regard to bumps, for example, may include establishing a list of suspect points: establishing a plurality of first distances between each of a plurality of originating points on at least one preliminary traced edge and a corresponding closest point positioned along the primary centerline, establishing a plurality of second distances between each of a plurality of second centerline points point on the primary centerline to a corresponding closest point positioned on the at least one edge, and determining deviation, from the centerline, an absolute distance of the second distance and the first distance. The method may also include determining a gradient cost function, inversely proportional to a gradient magnitude at each edge point, determining a combined function aggregating deviation from the centerline and the gradient cost function, where upon the combined function being greater than a predefined value, the corresponding edge point is determined to be a bump point in a bump. The method may further include determining a bump area defined by a plurality of connected bump points and a cutting line adjacent the vessel of interest, where the cutting line comprises a line which substantially maximizes a ratio between the bump area and a power of a cutting line length, and cutting the bump from the edge at the cutting line to establish a final edge.

The centerline of the vessel of interest may be determined one or more of the following steps: determining final traced edges of the vessel of interest, determining pairs of anchor points, wherein each pair comprises one point on each edge, determining a cross-sectional line by searching for pairs of anchor points which, when connected, establish the cross-sectional line substantially orthogonal to the center-line, dividing each edge into a plurality of segments using the anchor points, where for each segment, correspondence between the edges is established in that every point of each edge includes at least one pair of points on an opposite edge and a total sum of distances between adjacent points is minimal. The method may also include connecting the centers of the plurality of segments to determine the centerline.

Densitometry, according to embodiments of the invention, may comprise properly subtracting a background influence. In particular, determining densitometry values may include one of more of the following steps: establishing a plurality of profile lines substantially parallel to at least one edge of the vessel of interest, establishing a parametric grid covering the vessel of interest and a neighboring region, where the parametric grid includes a first parameter of the vessel of interest along the length thereof and a second parameter for controlling a cross-wise change of the vessel of interest and sampling the image using the grid to obtain a plurality of corresponding gray values—the gray values are investigated as functions on the profile lines. The method may also include substantially eliminating detected occluding structures on the outside of the vessel of interest, the structures being detected as prominent minima of the parameters, substantially eliminating prominent minima detected on the inside of the vessel of interest, averaging gray values in a direction across the vessel of interest separately for each side of the vessel of interest, determining a linear background estimation on the grid inside the vessel of interest and determining cross-sectional area using the eliminated prominent minima Embodiments of the invention may include determining healthy vessel dimensions using an iterative regression over a healthy portion of the vessel of interest. In particular, iteration comprises a compromise between a pre-defined slope and a line that follows healthy data. In one embodiment, the compromise is toward the line that follows the healthy data if the line corresponds to actual data over a plurality of clusters. The determined healthy dimensions of the vessel of interest may be displayed, either in 2D and/or in 3D.

Three-dimensional reconstruction of the vessel of interest may include: determining a conventional epi-polar distance $p_1$ for the plurality of centerline points in the first image, determining a conventional epi-polar distance $p_2$ for the plurality of centerline points in the second image and re-determining $p_2$ substantially in accordance with $p_{2new} = p_2 + \delta$, where $\delta$ is a smooth compensatory function establishing correspondence of one or more landmark points.

An epi-polar indicator, and associated means (e.g., application program/computer instructions for a processor), may be included with various embodiments of the present invention. Accordingly, after receiving input for identifying the vessel of interest in the second image, the epi-polar indicator may be displayed for indicating a concurrence between the first image and second image for producing a "good" three-dimensional reconstruction of the vessel of interest.

Data, in some embodiments of the present invention, may be cross-referenced among other data.

Other embodiments of the present invention are directed to a system for three-dimensional reconstruction (3DR) of a single blood vessel using a plurality of two-dimensional images. Such a system may include a display for displaying a first image of a vascular network and a second image of a vascular network, and a three-dimensional reconstruction of a vessel, input means for, receiving input for identifying a vessel of interest on the first image and for identifying the vessel of interest on the second image, and a processor arranged to operate one or more application programs and/or computer instructions. The computer instructions may include instructions for allowing the processor to perform one or more of the following: tracing the edges of the vessel of interest including eliminating false edges of objects visually adjacent to the vessel of interest, determining substantially precise radius and densitometry values along the vessel, tracing the edges of the vessel of interest in the second image, including eliminating false edges of objects visually adjacent to the vessel of interest, determining substantially precise radius and densitometry values along the vessel of interest in the second image, determining a three dimensional reconstruction of the vessel of interest and determining fused area measurements along the vessel. Other computer instructions may be included for accomplishing any of the foregoing not explicitly included herein.

Yet other embodiments of the present invention are directed to a system for three-dimensional reconstruction (3DR) of a single blood vessel using a plurality of two-dimensional images. The system may include display means for displaying a first image of a vascular network, and a second image of the vascular network and the 3DR, input means for identifying a vessel of interest on the first image and the second image, tracing means for tracing the edges of the vessel of interest in each image including elimination means for eliminating false edges of objects visually adjacent to the vessel of interest in each image and a processor. The processor may be used for determining a centerline, comprising a plurality of centerline points, determining substantially precise radius and densitometry values along the vessel, determining substantially precise radius and densitometry values along the vessel of interest in the second image, determining a three dimensional reconstruction of the vessel of interest, determining fused area (cross-section) measurements along the vessel and establishing the 3DR of the vessel of interest.

Other embodiments of the present invention may include a system for three-dimensional reconstruction (3DR) of a single blood vessel using a plurality of two-dimensional images is provided (according to any of the foregoing, for example) and may also include an angiography system comprising a platform for scanning a patient, a C-ARM X-ray system including an x-ray source, a detector, a step motor for moving the C-ARM, and a workstation for doing QCA. The workstation may include display means for displaying a first image of a vascular network, and a second image of the vascular network and the 3DR, input means for identifying a vessel of interest in the first image and the second image, tracing means for tracing the edges of the vessel of interest in each image including elimination means for eliminating false edges of objects visually adjacent to the vessel of interest in each image and a processor.

Still other embodiments of the invention are directed to computer readable media (e.g., floppy discs, hard-drives, CDs, DVDs, smart media and other flash storage), whether permanent or temporary, for storing one or more application programs made up of computer instructions (or just computer instructions) for enabling a computer (e.g., processor, and/or a workstation/network) to perform the methods according to the various embodiments of the present invention.

Any of the embodiments of the invention may also be used with existing angiography systems, or other vessel imaging systems. The relation of the present invention to such systems is readily apparent to one of ordinary skill in the art in view of the present disclosure.

Other embodiments, as well as objects and advantages of the present invention will become more clear with reference to the following detailed description and attached figures as briefly described below. dr

BRIEF DESCRIPTION OF THE DRAWINGS

FIG. 35A is a first image illustrating traced edges of a vessel of interest.

FIG. 35B is a second image for the vessel of interest, which includes an epi-polar bar and lines for indicating the applicability of the second image as a good candidate for 3DR, with relationship to the image\vessel imaged in FIG. 35A

DETAILED DESCRIPTION OF THE EMBODIMENTS

Figure 1:
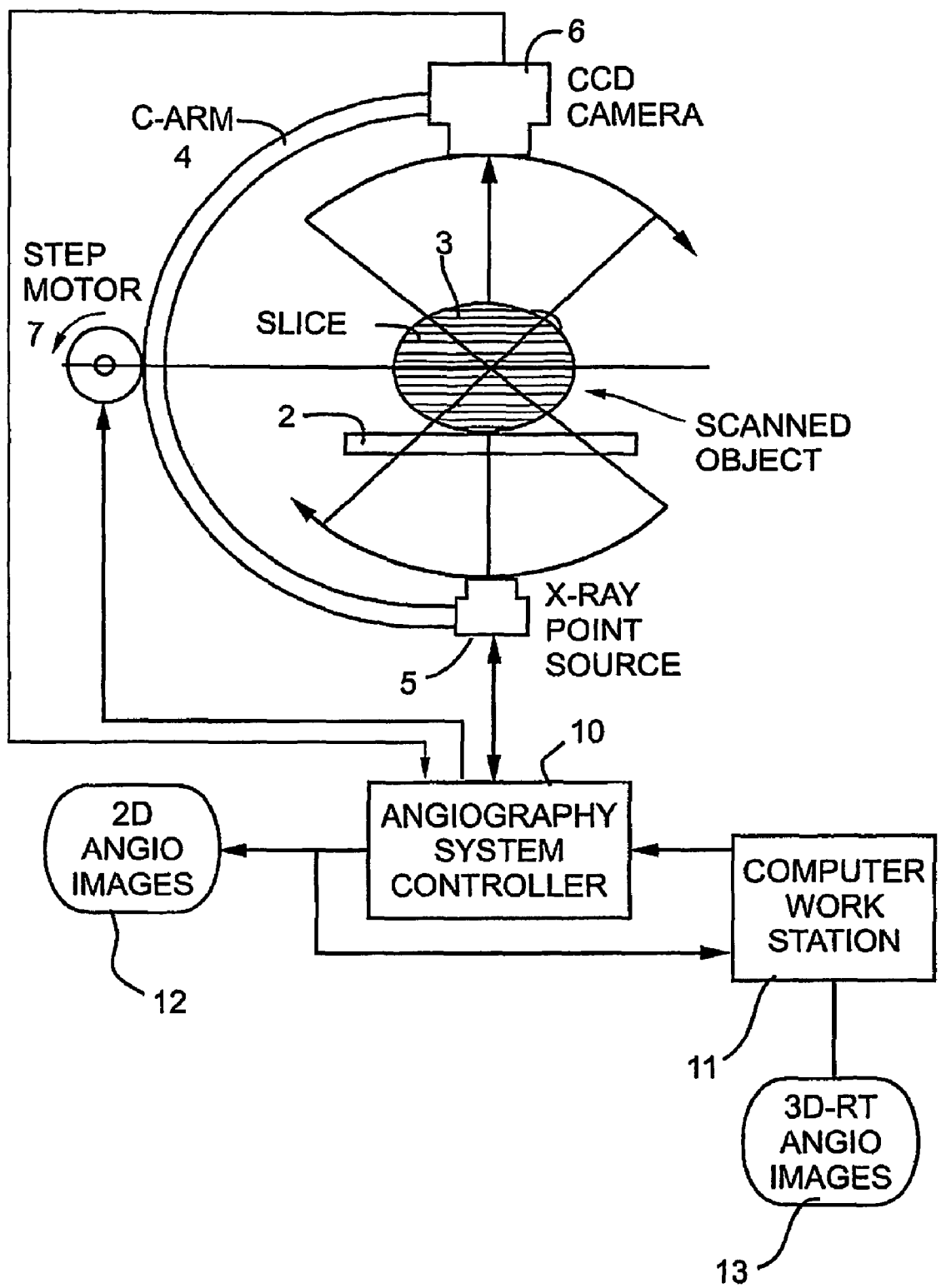
FIG. 1 illustrates a schematic of a system and interface to a C-ARM according to an embodiment of the present invention.

The embodiments of the present invention may be integrated into existing catheterization systems to produce both 2D and 3DR images. FIG. 1, for example, illustrates one exemplary system constructed in accordance with some embodiments of the present invention useful for producing either two-dimensional angiographs and/or 3DRs of a patient's vascular system. Such a system may include a horizontal support such as a table 2 for a patient 3 under examination, and a gantry C-arm 4 which encloses the patient's body. The C-arm supports a radiation source 5 at one side of the patient's body, and a radiation detector 6 at the opposite side and in alignment with the radiation source. The radiation source 5 may be an X-ray point source which produces, for example, a conical X-ray beam. The radiation detector, which may consist of a CCD camera having a plurality of radiation detector elements.

The apparatus may further include a step motor 7 for changing the angular position of the radiation source and radiation detector with respect to the body under examination. In a preferred embodiment of the invention described below, the step motor 7 is capable of rotating the radiation source and the radiation detector about the Z-axis, which is the longitudinal axis of the patient's body, and also about the X-axis, which defines, with the Z-axis, the plane of the horizontal body support.

The electronics which may be included with the system of FIG. 1 may include an angiography system controller 10 which controls the radiation source and also the step motor to successively produce the exposures of the body from a plurality of different angular positions with respect to the body. The controller may also receive the electronic outputs from the radiation detector elements in the CCD camera. A computer work station 11 may be included which controls the angiography system controller 10 to produce a two-dimensional images 12 of blood vessels projection to any selected play (cine-runs), as well as 3DR images 13. Control is preferably synchronized with a cardiac and/or respiratory gating signals produced by an ECG sensor and/or a respiration sensor (not shown), so that images of the blood vessels may be obtained during the same point during a cardiac cycle or respiration cycle.

The workstation may include the application programs and/or hardware for enabling the operation of the systems and methods of the embodiments of the invention for 2D and 3DR, as well as the associated QCA. Also, the systems and methods according to embodiments of the present invention may be and add-on component to the above-described configuration for a catheterization room. In some embodiments, another workstation, including hardware and software, may be interfaced to the catheterization room, for receiving cine-runs, and optionally, C-ARM angulation and ECG to process and present 3DR.

First Group of Embodiments

Image Acquisition

Two-dimensional (2D) X-ray images of a plurality of cine-angio runs are captured and presented on the monitor substantially in real-time during catheterization of a patient. In addition to the images, C-arm angulation data and ECG data may also be acquired. Using the ECG sensor, an ECG Gating process may be used to present the optimal ("best") image (End Diastolic Frame) from the captured images of the each cine-angio runs.

The capturing of cine-runs may be accomplished in analog (using, for example, a frame grabber) or via standard DICOM connection (preferred). DICOM is an acronym for "Digital Imaging and Communications in Medicine", and is a file format and digital communications protocol that allows medical equipment and software from different manufacturers communicate with one another, so that medical data can be easily shared.

Figure 33:
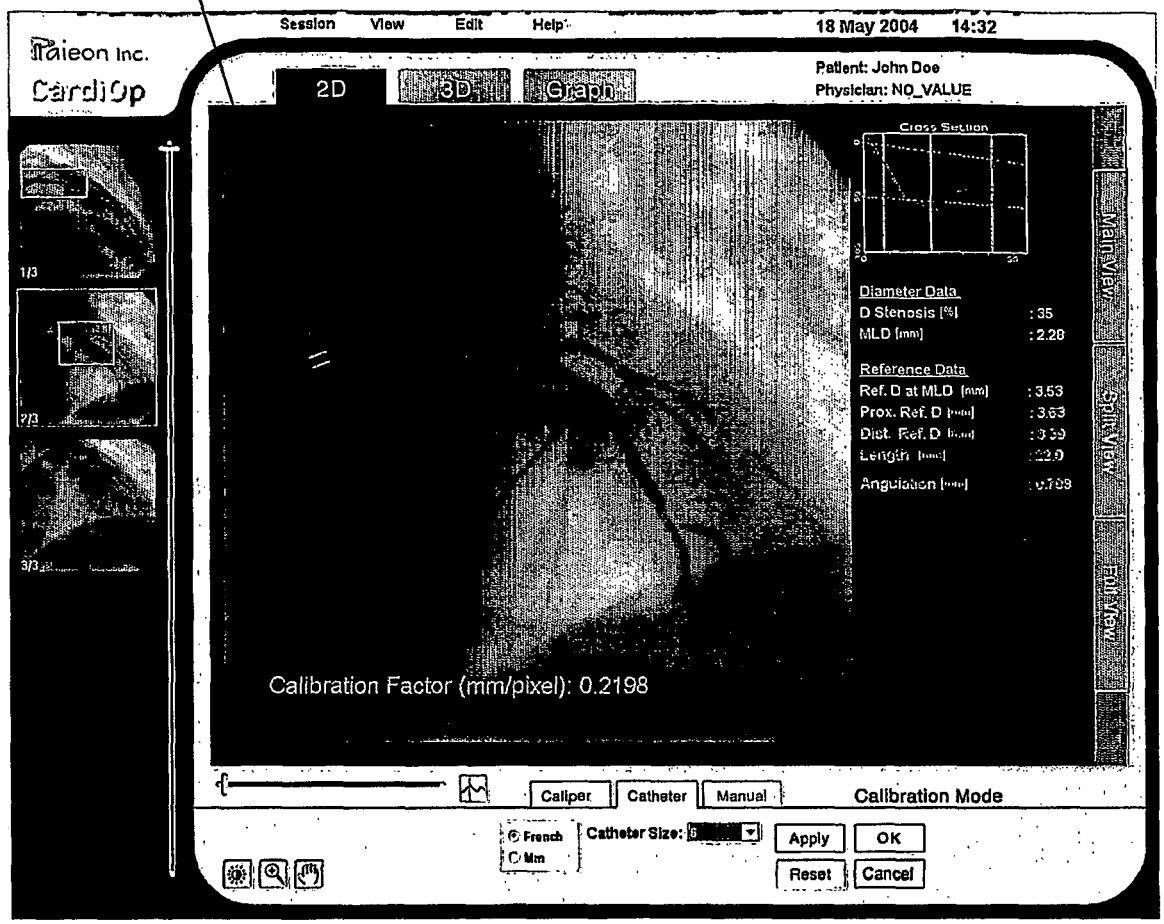
FIG. 33 is a screenshot for a 3DR system according to the present invention illustrating a calibration technique.

After image capture, an operator may perform catheter calibration on an image according to known methods. Examples of such know methods can be found in U.S. Pat. No. 5,042,486 and PCT patent publication WO 94/04938, whose disclosures are incorporated herein by reference. Other calibration devices are described in U.S. Pat. Nos. 3,644,825, 3,868,565, 4,017,858, 4,054,881 and 4,849,692, the disclosures of which are also incorporated herein by reference. Some embodiments of the present invention may utilize an automatic calibration using the DICOM data. In other embodiments, catheter calibration may be accomplished by identifying the catheter edges (3310), as shown in FIG. 33. In this way, knowing the size of the catheter, one can determine distances (e.g., pixel to mm transformation) in each image.

Vessel of Interest Identification

Figure 2:
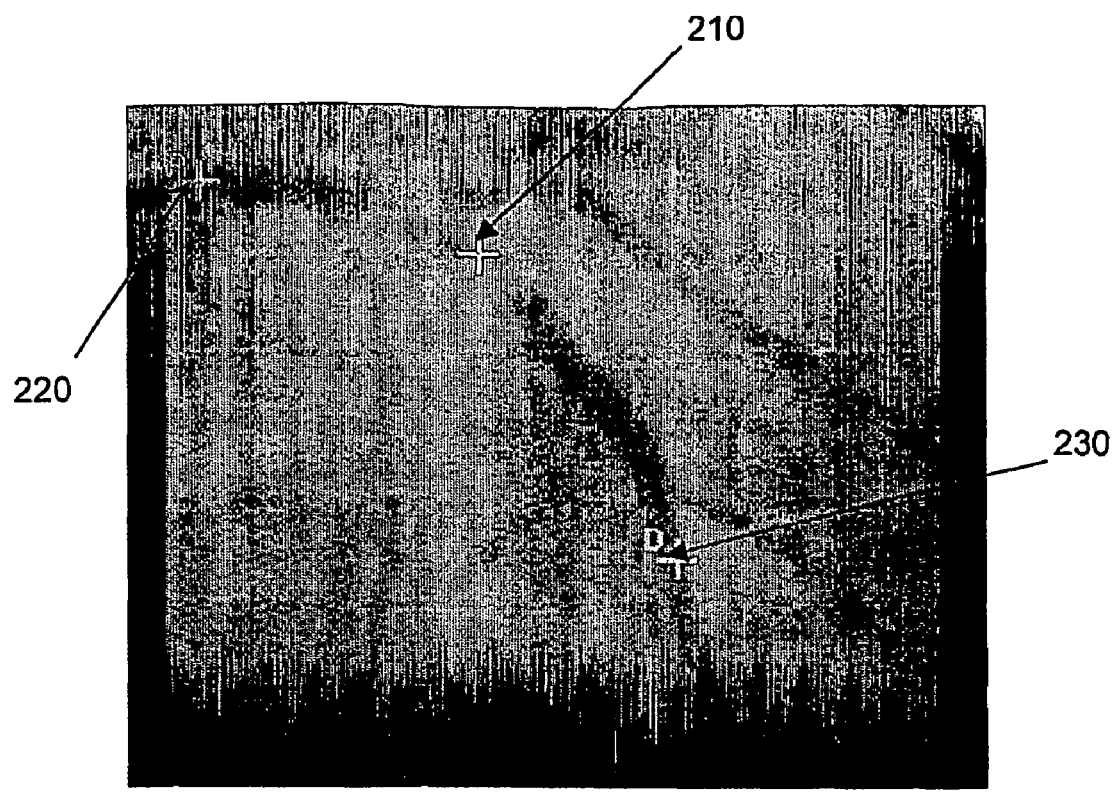
FIG. 2 illustrates a three (3) point marking of a stenotic vessel.

With the images obtained from the cine-angio runs, and preferably after calibration, an operator of the system may mark a stenosis of a vessel of interest, by either manual selection (by the operator), or a system selected (e.g., via ECG gating) image, from at least a first image and a second image each selected from a separate cine-angio run. In one embodiment, the marking includes at least three (3) points, but in other embodiments, less than three points may be used (see "Limited Marking 3DR" below). The three (3) points may include (FIG. 2): a first point 210 to mark the stenosis general location, a second point 220 proximal to the stenosis, -and a third point 230 distal to the stenosis. After an image is marked, edge detection and centerline definition for that image may be established.

Edge Detection (Edge Tracing)

Initially, a primary centerline may be extracted using known algorithms (such as dijkstra optimization or wave propagation method). The only property the primary centerline should possess is that it be a path inside the marked vessel. In this regard, the user marking points, which can be located outside the vessel due to an imprecise user's pointing, may be automatically checked and moved, if necessary, into the vessel. Accordingly, the tracing algorithm may use these properly located marking points to an extract a primary centerline.

For each image, the edges of the marked vessel of interest are traced. Although edge detection (i.e., edge tracing) may be accomplished via known methods using known algorithms (see, for example, Gradient Field Transform, "A New Approach For The Quantification of Complex Lesion Morphology: The Gradient Field Transform; . . . ", Zweit & Reiber, JACC vol. 24; "Single Source Shortest Path"; Introduction To Algorithms; Cormen, Leiserson & Riverst., p. 527; each of which is herein incorporated by reference in its entirety). However, using these known methods, edge detection in angiography poses many difficulties, for which embodiments of the present invention address.

Figure 3:
FIG. 3 is an image from a cine-angio run comprising a vascular network.
Figure 4:
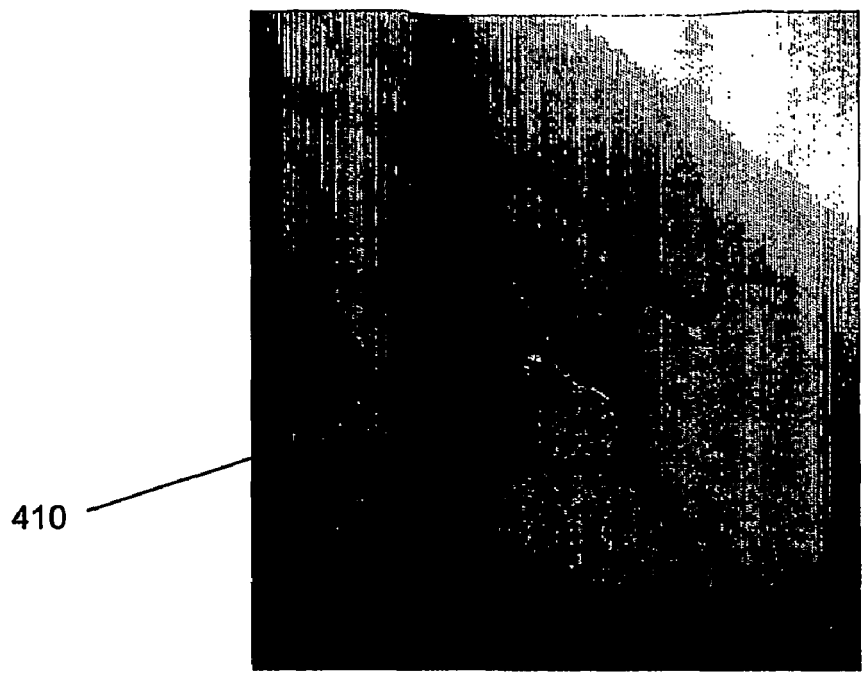
FIG. 4 is the image from FIG. 3 having an incorrect traced edge.

Such difficulties relate to a detected edge of a vessel of interest "detouring" off the actual edge of the vessel onto an edge of a visually adjacent vessel (or other feature/object) from the complex vascular structure which may surround the vessel of interest (in which the vessel of interest may be apart of)(see FIGS. 3-4, illustrating a complex network of vessels and an incorrect edge trace 410). Moreover, a similar phenomenon is recognized where the end-point of the vessel of interest is marked, near which likes another parallel (or substantially parallel) vessel. Accordingly, prior to detecting the edges of the vessel of interest (using, for example, the above edge detecting methodologies, or modified versions thereof), embodiments of the invention conduct pre-processing to substantially reduce and preferably eliminate such detours from appearing as the final edge.

Figure 5:
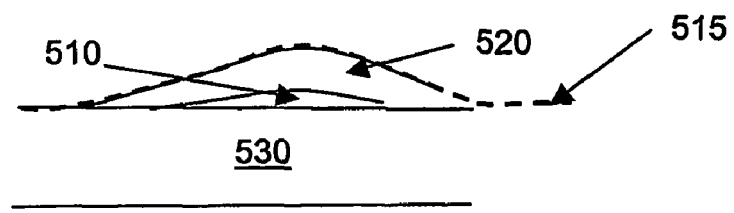
FIG. 5 is a schematic of a vessel having a bubble area.
Figure 6:
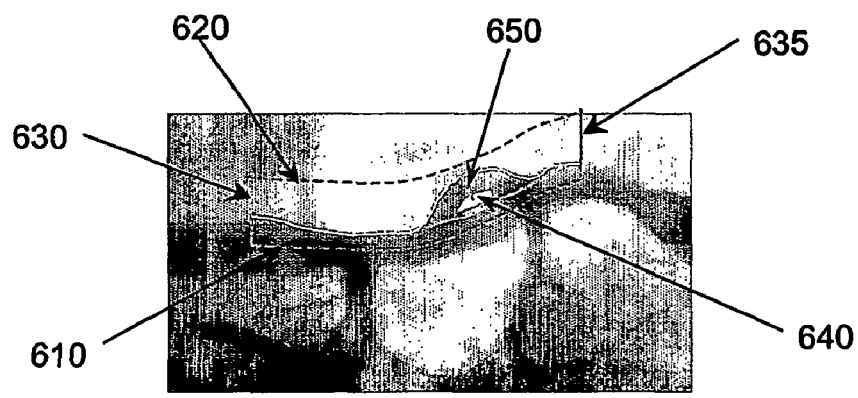
FIG. 6 is an image from a cine-angio run which includes references to items used in edge correction.
Figure 7:
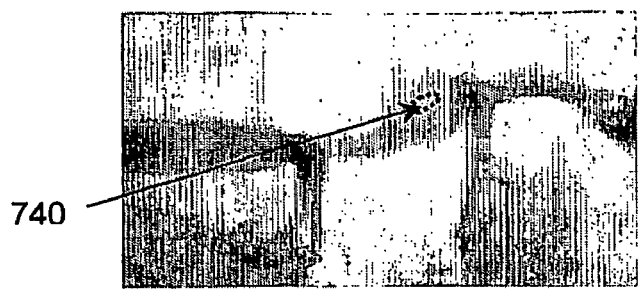
FIG. 7 is an image illustrating a detected bubble of a vessel of interest.
Figure 8:
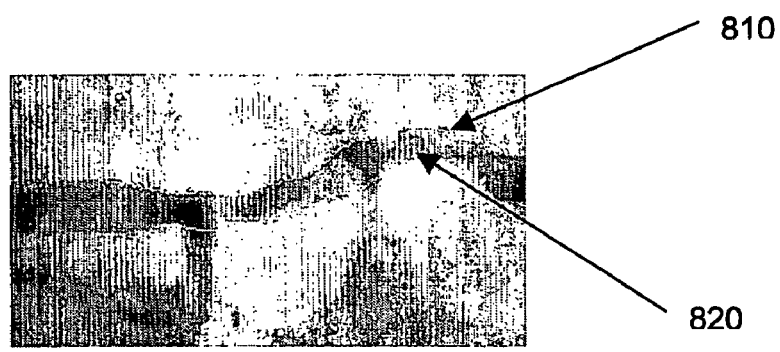
FIG. 8 is the image of FIG. 7 illustrating final traced edges.

The phenomenon is shown in FIG. 5 and is addressed by seeking out what is referred to as a "bubble" 510, adjacent the vessel of interest, which results in an incorrect edge 515. A bubble comprises a bright spot (relatively) surrounded by darker areas (e.g., another vessel 520) near the vessel of interest 530 and may be detected using a pixel map of the image. As shown in FIGS. 6-8, one or more bubbles may be detected and substantially eliminated as a problem for edge detection in the following manner.

A region of interest, as shown in FIG. 6, for tracing of each edge is defined. It is bounded by a primary centerline 610, a "lane" 620 (which is a line positioned a sufficient distance away from the primary centerline, for example, twice the distance as a maximal possible healthy radius, from primary centerline) and two lines (Source 630 and Target 635), closing the hole between primary centerline and the lane. Thus, the region of interest is bounded by four of the above-mentioned lines for one of the two edges. The edge tracing is a process of finding an optimal path connecting the Source and the Target lines and need not leave the region of interest. A bubble, cluster 640 (see also, FIG. 7, cluster 740) in the region of interest is then detected as a bright spot within a darker surrounding area. Then, starting with an arbitrary pixel within the bubble, neighboring pixels successively most distant (preferably) from the primary centerline are sought, until a border (lane) is reached. In this manner, a line drawn from cluster 640 to the lane defines a preventing path 650. A plurality of such preventing paths are constructed. Thereafter, when edge tracing is preformed, no edge line which bypasses the bubble is possible—the edge tracing process ignores the bubble (e.g., by being prevented from crossing a preventing path), and thus, yields a correct edge. FIG. 8 illustrates final edges (810 and 820) which by-pass the bubble.

Figure 9:
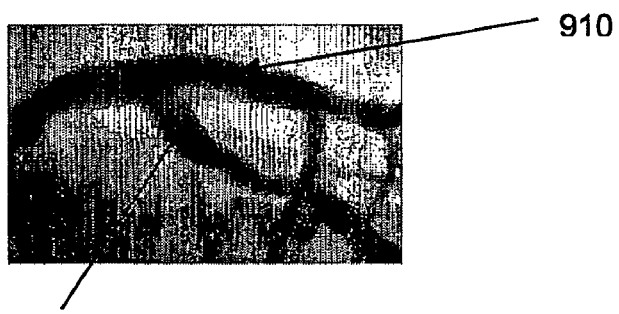
FIG. 9 is an image from a cine-angio run for illustrating bump detection.
Figure 10:
FIG. 10 is the image of FIG. 9 with an incorrect edge tracing (having a bump).
Figure 11:
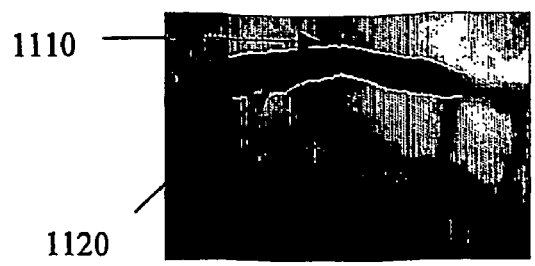
FIG. 11 is the image of FIG. 9 with corrected edges.
Figure 12:
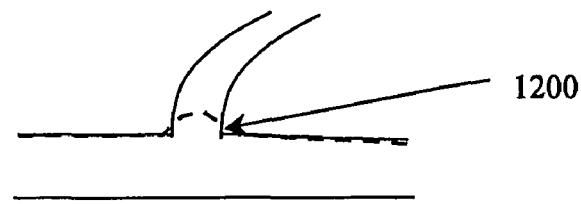
FIG. 12 is a schematic of a bump detection and elimination process
Figure 13:
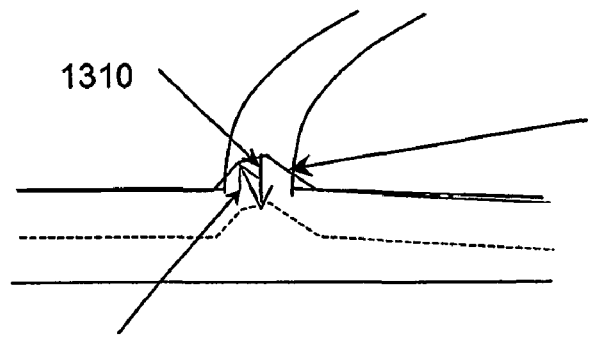
FIG. 13 is a further schematic of the bump detection and elimination process.
Figure 14:
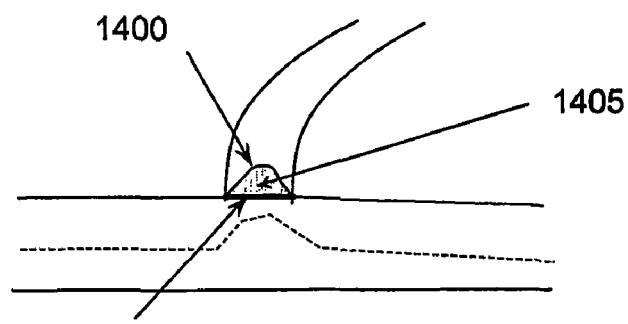
FIG. 14 is a further schematic of the bump detection and elimination process.

Another problem exists where a detected edge detours off the edge of the vessel of interest as a result of a side branch on the vessel of interest, yielding a "bump" appearance. As shown in FIGS. 9 and 10, a side branch vessel 920 off of the vessel of interest 910, creates an incorrect edge 1010 (FIG. 10). Embodiments of the present invention address this concern preferably after bubble detection and after the primary edges have first been detected, which, with reference to FIG. 11, presents a correct edge (lines 1110 and 1120). A bump may be characterized (FIGS. 12-13) by an increase in distance between opposite edges (manifested as increase in distance between edge and centerline), and low gradients on suspected bump edges. The bump process (in some embodiments) includes two steps: bump detection and bump correction.

Accordingly, after a primary edge 1200 (FIG. 12) is found, bumps are sought out. Starting from a point on the edge 1300, the closest point on the primary centerline (or opposite edge or any line substantially parallel to the vessel) is found and a distance between the two is found (arrow 1310). Then, from a point on the centerline, the closest point on the edge is found and a distance between the two is found, which is denoted by arrow 1320. Deviation from the centerline is defined as an absolute difference between distances 1320 and 1310.

Preferably, all edge points are checked for as being bump points. Thereafter, for every point on the primary edge, a combined function is calculated. This function aggregates two components: deviation from centerline and gradient cost function (for example, a condition on the gradient value can be expressed via a gradient cost function which may be inversely proportional to the gradient magnitude). Specifically, a suspected bump point having a big deviation from centerline and/or low gradient, may be considered an actual bump point. The combined function, in particular, can be product of deviation from centerline and gradient magnitude. A bump comprises a plurality of bump points.

The detected bumps are corrected by "cutting" the bumps from the edge. After bump points have been determined (which may include one or more neighboring edge points), an area 1405 of the bump is then determined, using the outer border of the bump 1400 and a cutting line 1410 as inner border. The appropriate cutting line is finally determined by a line which maximizes the ratio between the bump area and a function of cutting line length, for example, a power of the cutting line length, and which is also the correct edge of the vessel of interest. This "cuts" the bump from the imaging of the vessel and establishes the correct edge of the vessel.

Centerline Definition

The centerline definition, being an input for determining radius and densitometry values, ultimately determines stenosis measurements, and thus is very important. By definition, the centerline is a line passing inside the vessel, between the edges. Every point in the centerline should be equally distant from the edges (i.e., the center). This is referred to as "problematic step" in the art and several methods are currently in use to determine such centerlines. Accordingly, any of the prior art centerline detection techniques may be used with the present invention. However, some embodiments of the present invention present a novel approach as disclosed below.

Figure 15:
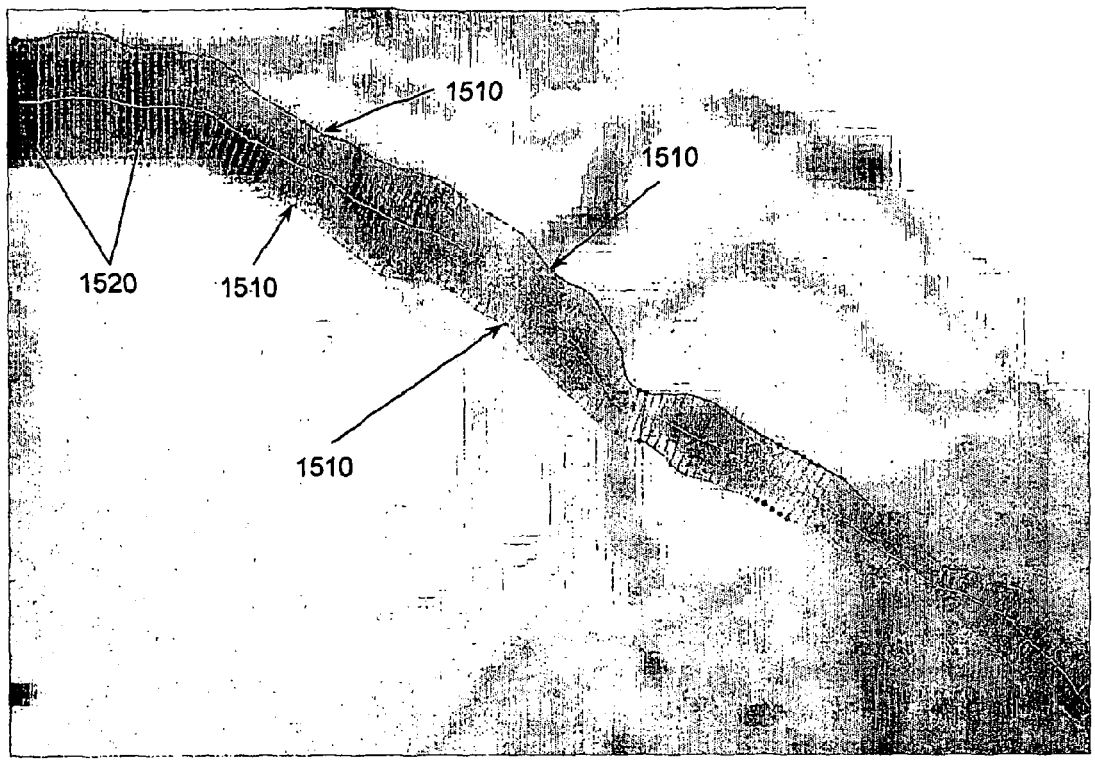
FIG. 15 is an image of a vessel of interest depicting centerline definition.

Accordingly, in one embodiment of the invention, a centerline is detected by seeking out pairs of anchor points (one on each edge)(see FIG. 15, item 1510). Specifically, if P and C are arrays of edge points (i.e., edge P and edge C), anchor points (Pi, Cj) are found according to the following definition: the pair (Pi, Cj) is a base pair if distance (Pi, Cj) is less than the distance (Pi, C), and distance (Pi, Cj) is less than the distance (P, Cj) for all points (P, C) from the edges. The anchor pairs are situated at bottleneck positions between the edges. This results in the cross-sectional line to be substantially orthogonal to the resulting centerline at anchor points, which is a natural property of a tubular body.

The edges are then divided into segments 1520 between the anchor points. For each segment, correspondence between edges may be established according to the following principles: every point of each edge must have at least one matched point on an opposite edge; and total sum of distances between matched pairs is minimal. Thereafter, the centerline is defined as connecting centers of the lines connecting each pair. Diameter values along the vessel could be simply the lengths of those lines.

Densitometry and Background Subtraction

Figure 16:
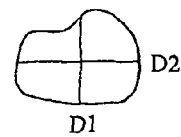
FIG. 16 is a schematic illustrating a typical cross section of a vessel.

Densitometry is the task of determining gray-levels along a vessel's cross-section to estimate the cross-section area of a vessel. While diameter measurement is view dependent, the cross-section area is not (being, theoretically, identical under every view). FIG. 16 describes a cross section of the artery. A different diameter is measured (D1 and D2), depending on the view direction, while the area of the cross section area possesses a property of directional invariance.

Figure 17:
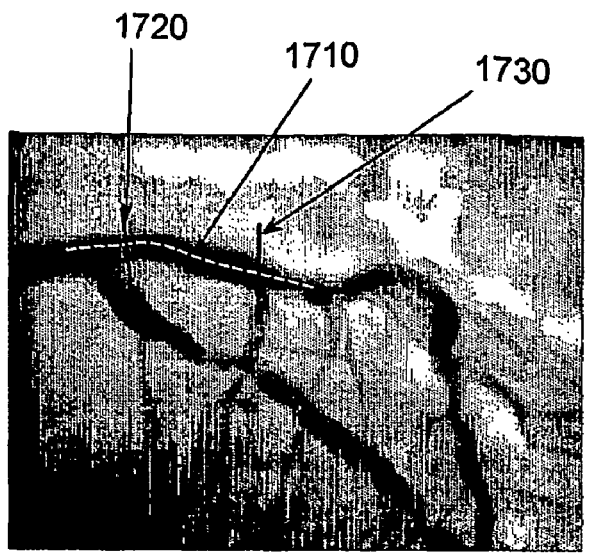
FIG. 17 is an image of a vessel of interest illustrating an approach of computing densitometry of a vessel.

The art of computing/determining this area (which is generally a function of gray levels along the cross section) is to "subtract" the background influence. There are many prior art methods regarding DSA (Digital Subtraction Angiography), which are very useful for static objects, but are hard to implement for a moving coronary vessel. Thus, other described methods are trying other approaches to "subtract" the background; these methods are very problematic, since they are very local (see FIG. 17). Specifically, as shown, dashed line 1710 represents a centerline of the vessel in interest. As briefly mentioned above, the classical approach to compute densitometry is to compute the background gray-levels along segments perpendicular to the centerline (for example, black lines 1720, 1730) and to "subtract" those values of the background (e.g., outside vessel boundaries/edges) from the vessel's gray-value. If indeed the perpendicular segments pass through background that is common to the artery (for example, the left segment passes through the catheter), such a method may work. The vessel of interest also "goes over" the catheter, thus, subtracting the catheter gray-level values is justified.

On the other hand, if the right segment 1730 goes through a branching vessel; the gray level values for the vessel of interest along this segment are not influenced by the branching vessel (unlike the previous example of the catheter). Thus, it is erroneous to subtract the "background" (actually the branching vessel's) gray-values from those of the vessel of interest.

Figure 18:
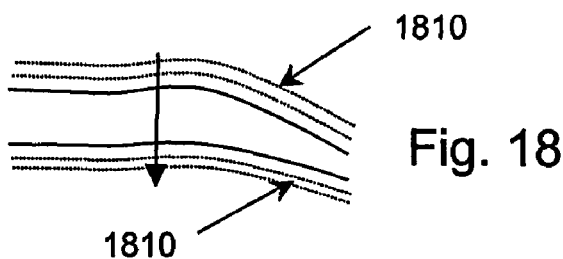
FIG. 18 is a schematic illustrating a principle of densitometry according to some embodiments of the present invention.

Accordingly, one embodiment of the invention presents a novel algorithm to "subtract" the background influence in a vessel. Initially, profile lines 1810 (FIG. 18) along the background are drawn, parallel to the edge. This way, the background analysis is much more global and may account for many things the classic approach cannot.

In order to consistently evaluate the background, a two parametric grid covering the vessel and neighboring region are applied. One parameter controls the change of the vessel along its length and the second parameter controls the change of the vessel cross-wise. The image is then sampled on the grid. Obtained gray values are investigated as functions on the lines parallel to the vessel (lines 1810, FIG. 18). The crossing vessels and other occluding structures are detected as prominent minima of the functions and preferably eliminated. The similar minima elimination is also performed on the grid inside the artery. The values of the grid outside the vessel are averaged in a direction across the vessel on both sides separately, and linear background estimation is calculated on the grid inside the artery. Next, cross-section area is calculated using subtracted background.

Figures 19A, 19B:
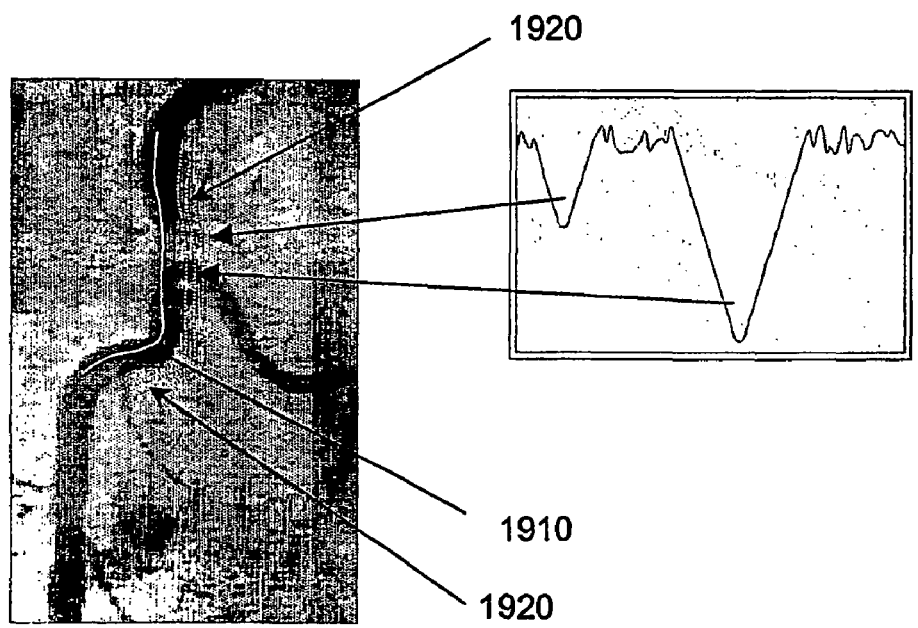
FIG. 19A is an image illustrating profile lines of a vessel of interest for computing densitometry.
FIG. 19B is a graph of densitometry values associated with the image of FIG. 19A.

As shown in FIG. 19A, the continuous line 1910 is the centerline of the vessel of interest. As described, parallel profile lines 1920 are drawn "outside" the vessel. The graph (FIG. 19B) represents gray-level along one such profile line. One can see that the branches, being much darker, are expressed as minima points within this graph. Each of these functions passes the procedure of cutting the downward peaks. As a result of this procedure, the vessels branching from the artery or crossing over the artery are neglected.

Point-To-Point Matching For 3DR

One of skill in the art will appreciate that any prior art 3DR method may be used to accomplish 3DR with any of the embodiments of the present invention (e.g., based either on orthographic or perspective imaging geometry model). However, the following is a method for improved 3DR, according to some embodiments of the present invention, which overcomes problems, for example, such as geometric distortions.

Because of presence of geometric distortions caused by scene changes between acquisitions, neither orthographic nor perspective transformation may be able to determine a substantially exact match between the images. The existence of such distortions and their influences on 3DR results are well known in the art: (i) errors in the 3D centerline reconstruction, and (ii) the fusion of mismatched data for cross-section estimation.

Accordingly, some embodiments of the invention include a method to obtain a substantially exact match between images using a more suitable approach than the prior art methods (see, for example, U.S. Pat. Nos. 4,875,165; 6,047,080; and 6,501,848), using local error corrections. Moreover, embodiments of the present invention automatically find and/or match landmark points between images.

Figures 20A, 20B:
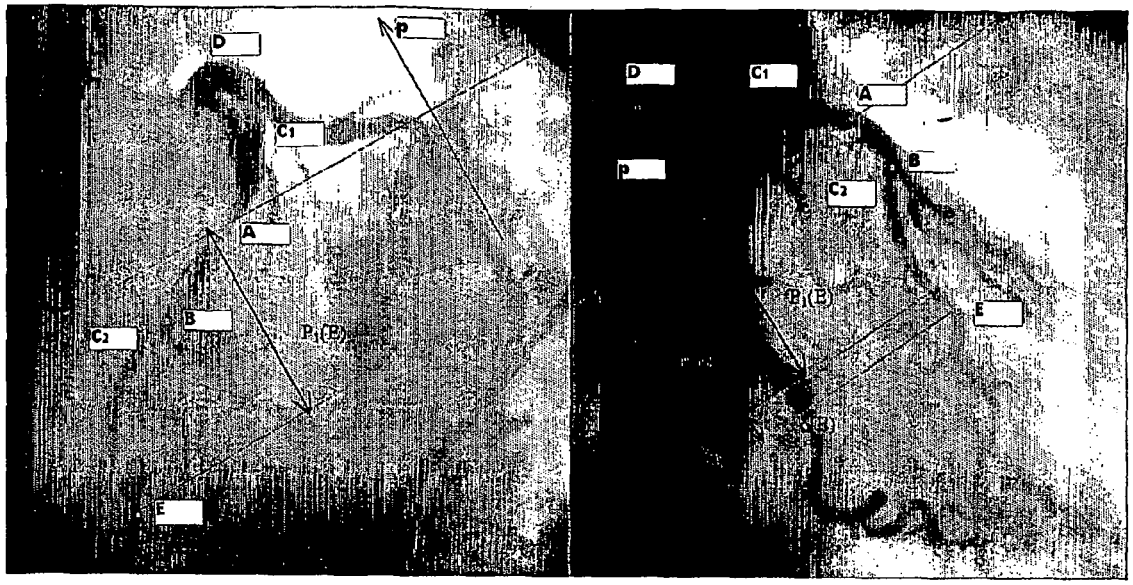
FIGS. 20A and 20B represent first and second images of a vascular network for illustrating point-to-point matching.

The principle underlying obtaining a substantially exact match of points between images is to allow a continuous deviation from the epi-polar constraint in order to minimize discrepancies along the vessel (e.g., branching points or other prominent landmark features). This approach may be used to obtain additional types of landmark points in order to improve reconstruction process. Specifically, in the framework of an orthographic projection, the epi-polar principle prescribes the corresponding points to be in equal distance (epi-polar distance p; see FIGS. 20A-20B) to a reference epi-polar line. Reference points can be marked by an operator in all images or a reference point marked by the operator in one image may then be refined in order for it to be accurately located by a local correlation algorithm (for example) in other images or the reference points can be found automatically in all the images.

The following types of landmark feature points may be utilized for calculation of improved epi-polar distance on an image: branching points (B); prominent features of diameter function (C1, C2); local extremes of epi-polar distance (D) as a function of centerline point; and points of extreme curvatures (E).

A vessel's centerline points are preferably matched according to the match of improved epi-polar distances. Specifically, a conventional epi-polar distance p is calculated for artery centerline points of reference image $p_1$ in FIG. 20A and for artery centerline of the second image $p_2$ in FIG. 20B. Then the second epi-polar distances $p_2$ are re-calculated in a form $p_{2new}=p_2+\delta$ in order to provide equal epi-polar distances at landmark points, where $\delta$ may be a smooth compensatory function establishing correspondence of the landmark points. If $p_1(LM)$ and $p_2(LM)$ are the epi-polar distances of a landmark point, then the compensatory function includes a value $\delta(LM)=p_1(LM)-p_2(LM)$ at this landmark point. See illustration of value $\delta$ for landmark point E. It is worthwhile to note that the compensatory function $\delta$ is calculated per specific vessel. This approach has a straightforward extension for the case of reconstruction from three (3) images. The two compensatory functions for the second and third images $\delta_2$ and $\delta_3$ have values $\delta_2(LM)=p_1(LM)-p_2(LM)$, and $\delta_3(LM)=p_1(LM)-p_3(LM)$ at landmark points.

Healthy Artery Computation

Embodiments of the present invention obtain a graph of measures: diameter or cross-section area, along the artery. In order to perform lesion analysis to compute measurements such as percent narrowing, the values of a healthy vessel need to be extrapolated (for example).

An iterative "Regression" function is aimed to calculate the regression line of the "healthy" portion of the incoming values. The Iterative Regression function calculates a regression line, which "ignores" extreme values (in most calling cases extremes are stenosis values or aneurysm values). Thus, the method is an iterative computation of regression lines, while removing extreme values (which are far from the line using a function of the standard deviation, for example), until the error (between predication and line) is less than a predefined error or number of points participating in a "creation" of the "regression" line—i.e., points which were not identified as stenosis or aneurysm—are too low (for example—less than between about 5-50% of the total number of points, in some embodiments, less than between about 15-30% in other embodiments, and less than between about 20% in preferred embodiments).

The classic model is further expanded using some embodiments of the present inventions in at least the following ways:
- a default slope is "forced" into the iterative regression; this is motivated by the anatomical fact that vessels are typically always tapered; and
- searches for "clusters" of data; it is hypothesized that the use of more separate consistent clusters yield better results than a single long cluster (again, based on the anatomical characteristics of the vessel).

Accordingly, the algorithm, on preferably every iteration, may solve a dilemma on whether to follow the prescribed default slope or to maintain the slope from the previous iteration. The measure of confidence about the slope seen on a previous iteration depends on the distribution of data points supporting the current regression line. If the data points supporting the current regression line are distributed evenly over the argument interval, more weight is given to the calculated slope. In an opposite situation, upon data points supporting a current regression line clustered as one block, more weight is given to the default slope.

These improvements are significant to the classic method, and provide not only better and more robust results, but also enable a system to consider more complicated cases, such as ostial lesions (which are lesions without a proximal or distal healthy portion for the vessel).

Figures 21A, 21B:
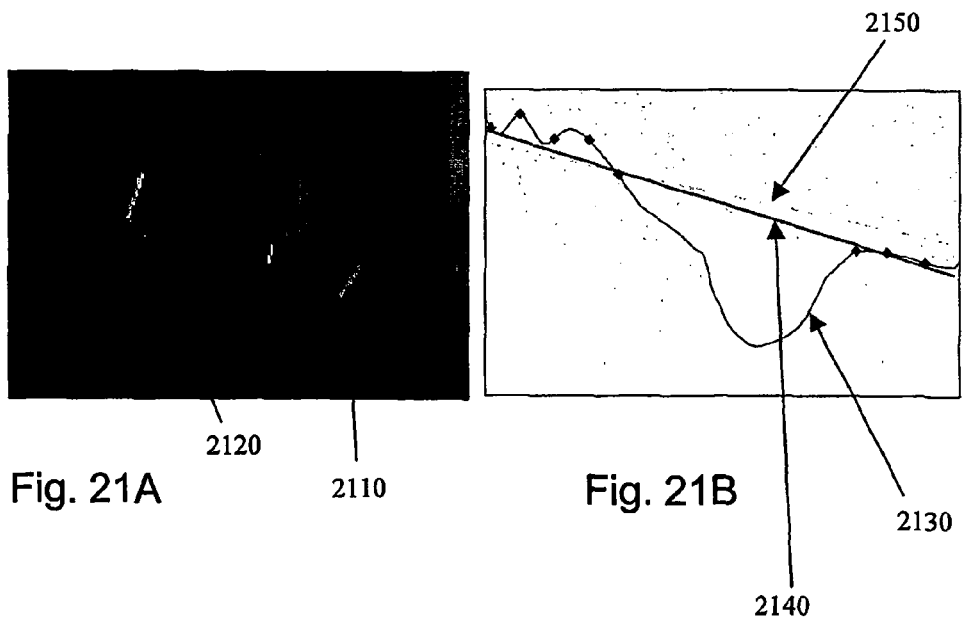
FIG. 21A is an image of a stenotic vessel for illustration of healthy artery computation.
FIG. 21B is a graph illustrating healthy artery computation of the stenotic vessel of FIG. 21A.

For example, FIG. 21A illustrates an example for a "normal" stenotic vessel, with both proximal 2110 and distal 2120 healthy portions. In a representing iteration of the healthy artery computations, FIG. 21B, there will be two clusters of points: one in the proximal part and one in the distal part (the bulleted points in the figure), for which the values of the radius line (2130) is relatively close to the values of the "regression" line (2140). Since there are two clusters distributed along the vessel, the new line (which strives to get closer to the data) will be accepted (rather than striving to stay closer to the predefined slope (2150).

Figures 22A, 22B:
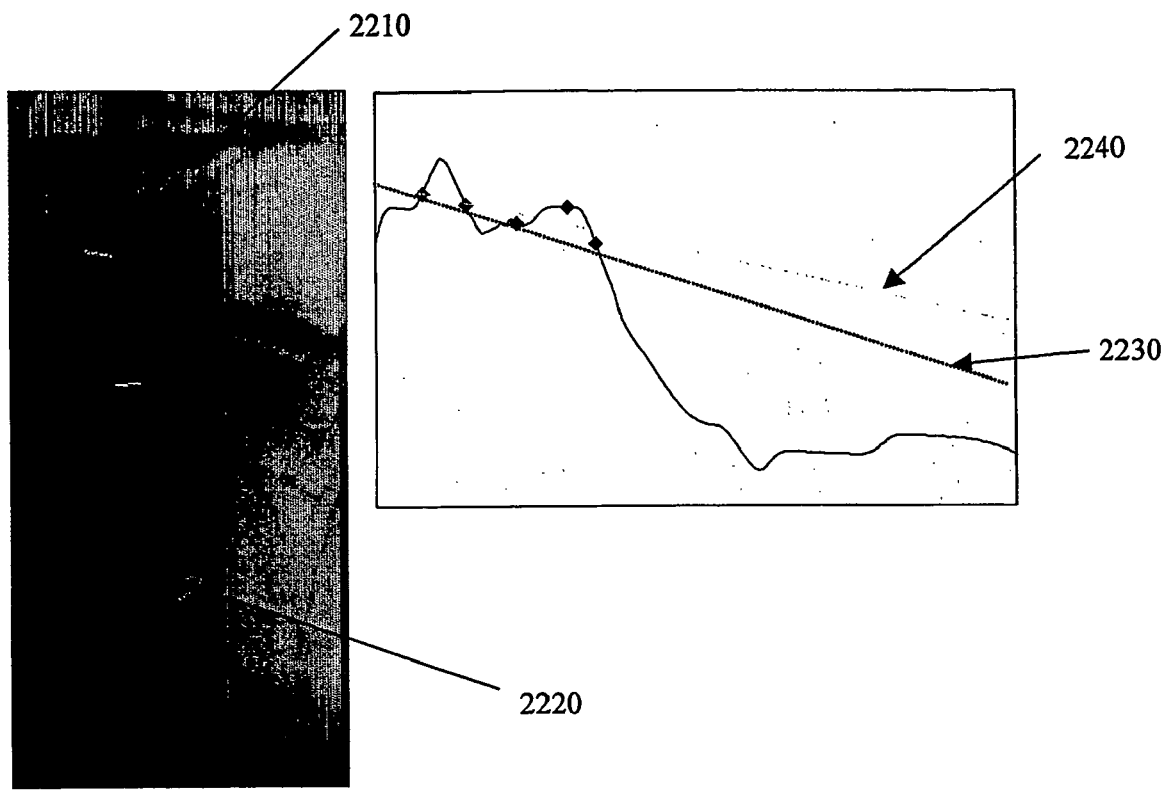
FIG. 22A is another image of a stenotic vessel for further illustration of healthy artery computation.
FIG. 22B is a graph illustrating the healthy artery computation of the stenotic vessel of FIG. 22A.

FIGS. 22A-22B represent another example. In this example, however, the vessel of interest presents an ostial lesion (or defused disease). As can be seen, the vessel has a healthy proximal portion 2210, but is stenotic through all its distal part 2220. This, of course, is manifested in the radius graph of FIG. 22B. In this case, the "regression line" 2230, includes one cluster of points, in which the radius value is close to the regression value. Thus, in this case, the result of the iteration will be closer to the default slope 2240 than to the regression line.

It is worth noting, that this step of healthy artery computation is described in two contexts, computation and for 2D display (see below). Accordingly, the above computation is preferably performed first, and then it serves as an input for the 2D display procedure. The difference between the two steps is that the computation step is generally related to the healthy values, while the second step (of display) may also be related to the "symmetry" of this values versus the lesion (for example, how to locate a value of 5 mm healthy "around" a 3 mm lesion).

Two Dimensional Healthy Artery Display—FIGS. 23-29

Figure 23:
FIGS. 23-28 are images of a stenotic vessel of interest, with reference to determining a healthy display of the vessel.
Figure 24:
Figure 25:
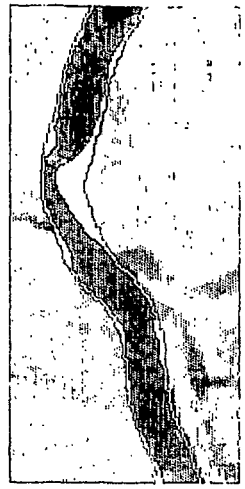

Healthy artery display is an excellent tool for image presentation in QCA systems, and helps a physician to analyze a stenotic area (e.g., in terms of symmetry, etc.). Since this information of the healthy vessel is not part of an angiogram, some embodiments of the invention establish such information based on an extrapolation of existing data (preferably lumen edges). Accordingly, FIG. 23 presents an image of a vessel network, FIG. 24 represents the detected edges of the lumen, with FIG. 25 represents the display (which may be extrapolated) of what the vessel would look like if it were healthy.

Figure 26:
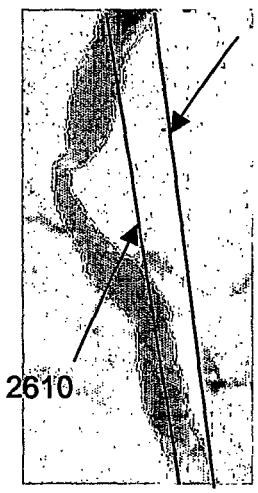
Figure 27:
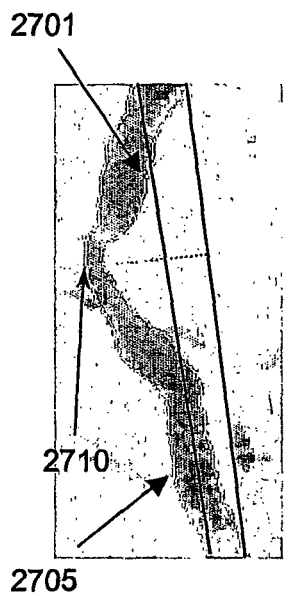
Figure 28:
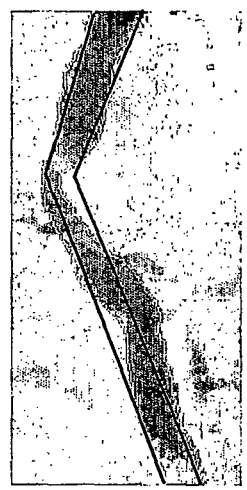

This process, according to one embodiment, includes connecting each edge's end-points to each other by a straight line, producing two lines 2610 and 2620 (FIG. 26). The lines are preferably produced to be as distant from each other, using a measure of "healthy radius" (see above). If the vessel lumen is entirely inside these two lines, the computation of the healthy artery is complete, as these lines may then represent the healthy artery. If the vessel lumen is not entirely inside these two lines, the most distant point of any lumen edge 2701, 2705 from those lines is found (point 2710, FIG. 27). This point (and the corresponding point at the second edge) divides each edge into two (see FIG. 28). This process is continued recursively.

The recursive procedure starts with the first segment defined as the whole artery, i.e. from is the start threshold of the artery and to is the end threshold of the artery. At each step of recursion, a segment of the artery limited by two couples of the previously found anchor points is received. Each couple contains two points from different edges. For example, let P and C be edges of the vessel of interest; the two couples of points can be denoted by ($P_{from}$, $C_{from}$) and ($P_{to}$, $C_{to}$). If, in the current step, a new point couple is found ($P_{new}$, $C_{new}$) between ($P_{from}$, $C_{from}$) and ($P_{to}$, $C_{to}$), then the procedure is called recursively twice with the two artery segments: ($P_{from}$, $C_{from}$), ($P_{new}$, $C_{new}$) and ($P_{new}$, $C_{new}$), ($P_{to}$, $C_{to}$). If no new couple is found, the branch of recursion calls terminate.

The new point is the point from the segment of interest that maximally deviates from the line connecting the centers of the limiting segments from and to. Accordingly, if the deviation is less than the correspondent healthy radius, then the new point is discarded and recursion branch terminates. If the deviation is greater than the correspondent healthy radius and this healthy radius in turn is greater than the input radius at this point, a new couple of anchor points are found.

Figure 29:
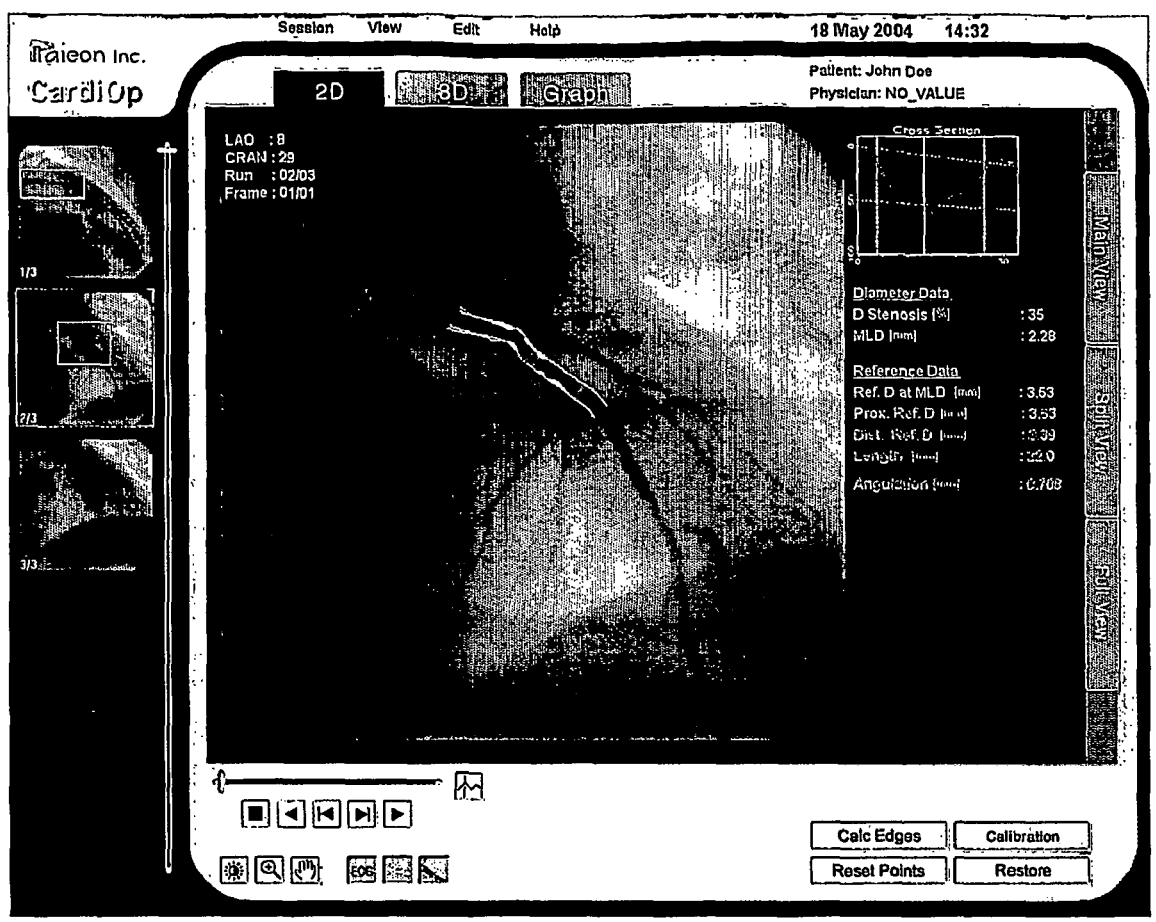
FIG. 29 is a screenshot for a 3DR system according to the present invention illustrating a 2D image related display (including healthy artery display in 2Dy.

One point of the new couple is the new point The second point constituting the new couple is determined via healthy radius and a point from the opposite edge corresponding to the new one. Namely, the second point constituting the new couple lies in the twice healthy-radius distance on the straight line connecting the new point with its counterpart. If the deviation is greater than the correspondent healthy radius and this healthy radius is less than the input radius at this point (e.g., an aneurysm) then a new couple of the anchor points also exists. The points of the new couple lie on the straight line connecting the new point and a point from the opposite edge corresponding to the new one. The distance between the points of new couple, as in the previous case, is equal to twice healthy-radius. But, contrary to the previous case, the points of the new couple are located symmetric relative to corresponding centerline point. A result of the termination of recursion is a list of anchor points. The healthy edge is finalized via interpolation between anchor points (for example, spline interpolation). See FIG. 29 showing, at center, two-dimensional, healthy artery display.

Three-Dimensional Healthy Artery Display

Figure 30:
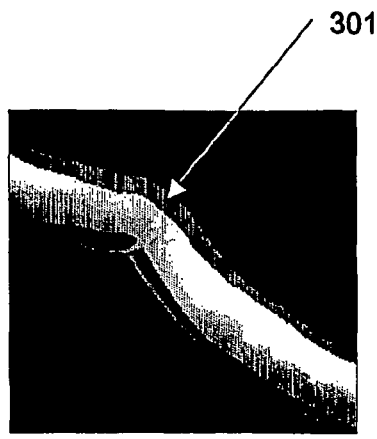
FIG. 30 is a 3DR of a vessel of interest.
Figure 31:
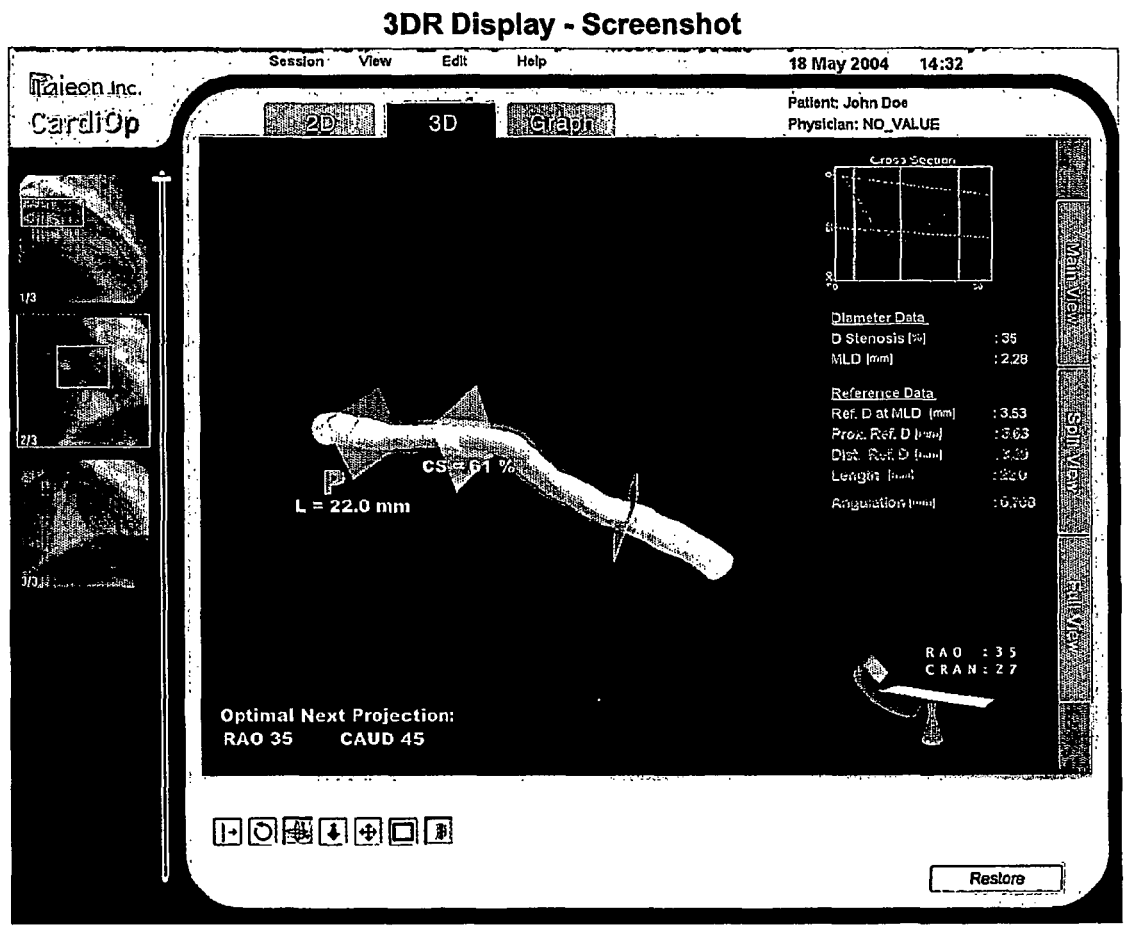
FIG. 31 is a screenshot of a 3DR, including display of information associated with the 3DR.
Figure 32:
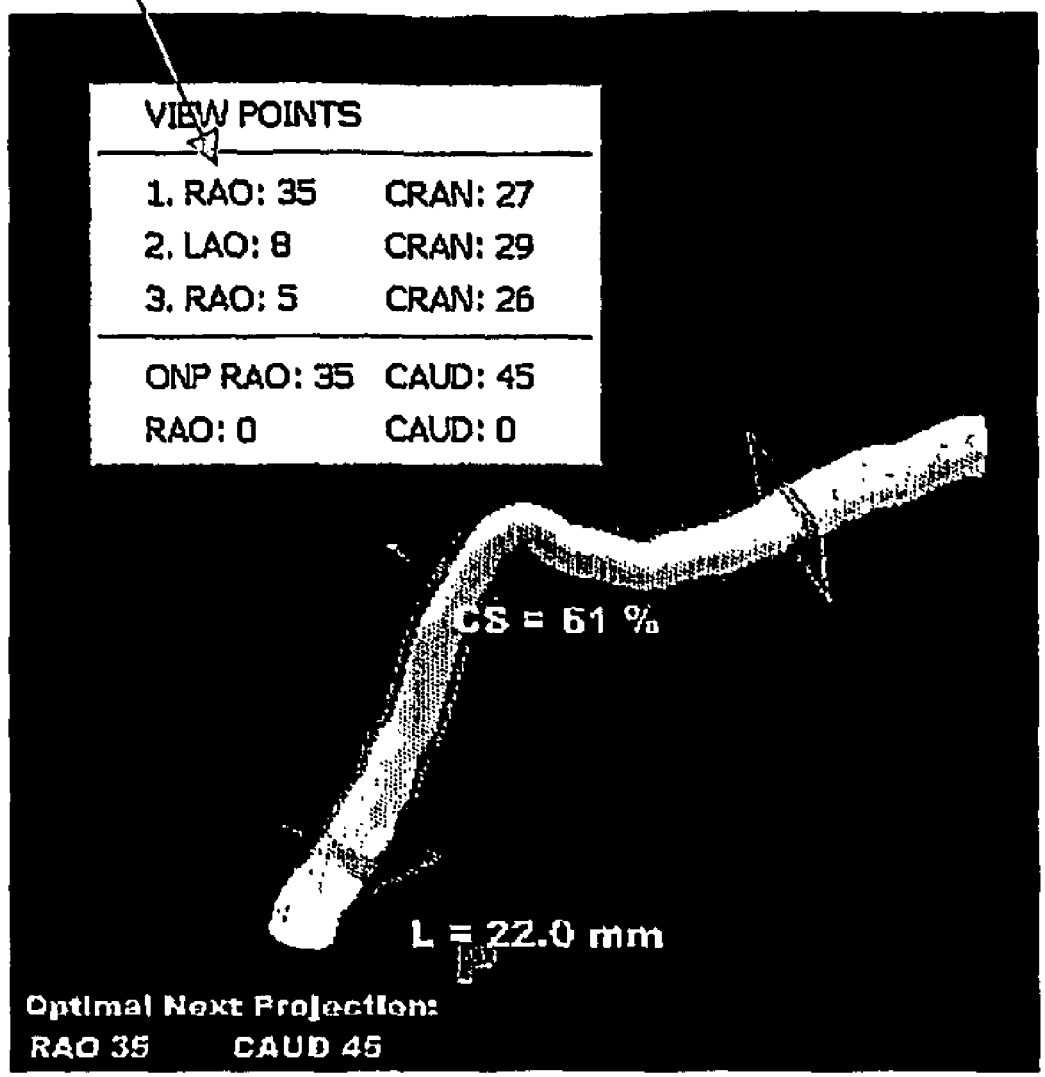
FIG. 32 illustrates an example of a pop-list that appears on screenshots of a system according to the present invention (also illustrating a 3DR of a vessel of interest).

The same notion for 2D of a healthy vessel is applied for 3D, As shown in FIGS. 30-32, transparent area 3010 is visualizing an approximation of the healthy vessel. Similarly to the 3D vessel reconstruction, the healthy 3D artery is defined by 3D healthy centerline and 3D healthy diameters. For 3D healthy centerline calculation, the known point-by-point matching of 2D centerlines may be utilized, applying it to the healthy 2D centerline points nearest to the available matched pair. The 3D healthy diameters may then be taken as a diameter corresponding to the healthy (reference) diameter. The cross section area may be a result of the fusion algorithm described below and the healthy diameter is (iterative) regression line for sqrt(cross section area/π).

Fusion

At this point, diameter measurements and cross-section area measurements have been obtained along the artery from various (at least 2) projections. Diameter values are view dependent and both diameter and cross-section area values may be corrupted by noise. Thus, it is preferable to combine all the data (diameter and area values) for better computation of the cross section area. Embodiments related to this implementation may also be based on assigning "quality" weight tags for every source of information based on the relation between the projection geometry and the artery's 3D geometry.

Accordingly, a 2D image participating in a 3D vessel reconstruction supplies 2D centerline, diameter and non-physical area value. After the 3D centerline reconstruction, 2D centerlines may be linked to the 3D centerline (i.e., every 3D centerline point linked to originating 2D centerline points). In other words for every 3D centerline point, there exists references to at least one set of measured 2D diameters and area values (preferably two sets for the at least two images).

The fusion process may be comprised of the following steps:
  the area (cross-section\densitometry) values may be corrected according to a local angle between the view vector and the 3D centerline direction, yielding measurements of orthogonal cross section areas;
  healthy diameter is calculated by applying an iterative regression algorithm to an average diameter function, yielding a reference physical measure (which is possible only from diameter values, which are in mm); average diameter may be used to average errors (which, in some embodiments, minimizes errors as well); and.
  healthy regression lines for square root of area are calculated. Since densitometry is an area measurement up to a constant factor, the functions: Radens=Densitomertry_Radius=sqrt (Densitometry) may be calculated in order to be comparable with Radius.

Diameter graphs and cross section graphs are configured to a common coordinate system (e.g., in mm) using (for example) an adjustment of the found regression lines. More specifically, the healthy line of the average diameter may be used as a reference line. In that regard, substantially all (and preferably all) data may be transformed (radius and densitometry per run) using (for example) the ratio between the data's healthy line and the reference healthy line.

RadsNorm=RadAvReg/RadsReg*Rads,

RadensNorm=RadAvReg/RadensReg*Radens,

Where:
RadsNorm are Normalized Radius values,
RadensNorm are Normalized Densitometry-derived-Radius values,
RadAvReg are healthy (regression line) values derived from average radius graph,
RadsReg are healthy (regression line) values derived from specific radius graph, Rads are specific radius graph values,
RadensReg are healthy (regression line) values derived from specific densitometry-derived-radius graph,
Radens are specific densitometry-derived-radius graph values, The fused area may be calculated as a weighted sum of densitometry areas and areas calculated via product of diameters (for example). The weights may be determined locally and may depend on viewing directions and/or local 3D centerline direction. The weight of densitometry area may be maximal if the corresponding view is orthogonal to the centerline direction, while weight of product of diameters may be maximal if both views are orthogonal to the centerline direction and in addition mutually orthogonal.

An ellipse area may be used to express the area as product of diameters and a circle area may be used to express the area as the power of the cross-section-derived diameters.

$Sellipse(i,j)=pi*RadsNorm(i)*RadsNorm(j), i\ !=j,$
  $i,j=1, 2, \ldots, NumberOfViews$ $Scircle(k)=pi*RadensNorm\textasciicircum 2, k=1, 2, \ldots, NumberOfViews.$ Some embodiments of the above described fusion approach utilize an assumption that the circular cross section in the healthy part of a vessel is represented by regression lines (of diameters and square roots of cross sections). On the other hand, in the stenosis region, the lumen cross section may be highly eccentric and the use of densitometry may be capable to improve the area estimation. Incorporation of densitometry area in such situation may improve the cross section estimation.

The combined (fused) area function may be determined as a weighted sum of Sellipse and Scircle:

$Sfused=(SUM_{i,j}(W(i,j)*Sellipse(i,j))+SUM_k(W(k)$
  $*Scircle(k)))/(SUM_{i,j}W(i,j)+SUM_kW(k))$ The weighting coefficients W(i,j) and W(k) express a fidelity of every particular measurement Sellipse(ij) and Scircle (k) of area. In some embodiments, the weighting coefficients may be defined using local orientation of the artery relative to the camera direction (line of sight vector). Specifically, let ViewVectors(k), k=1, ..., NumberOfViews be the camera line of sight unit vectors and ArtDir be the 3D artery direction unit vectors calculated at each artery point . Accordingly, the geometrical meaning of the weighting coefficients may be as follows. The weight W(k) may be the absolute value of sinus of the angle between the artery direction and the line of sight vector and becomes 1 when line of sight is orthogonal to the artery and 0 if the line of sight is parallel to the artery. The weight W(ij) expresses a quality of mutual orientation of two views and the artery and may reach the maximal value when artery direction and two line of sight vectors build an orthogonal basis, i.e. each two of vectors are orthogonal. Note, upon two view vectors being orthogonal to each other, the calculation of the cross section area using the ellipse area formula may be maximally justified. Alternatively, if radii have been acquired from the images with close view directions, then the use of elliptic cross section formula may be inconsistent. Accordingly, if, in addition to orthogonal views the plane of vectors, ViewVectors(i) and ViewVectors(j)) are orthogonal to the artery, then the area value Sellipse(i,j) may reach a maximal fidelity W(i,j)=1.

It is worth noting an additional consideration. In some embodiments, the above definition gives some priority to the area measurements originated from densitometry since W(i, j)<W(k), for k=i and k=j. While the elliptical area assumption may suffer from probable inconsistency, the area evaluation via densitometry does not bear such defect (as mentioned above), and the priority to the densitometry may be reasonable.

Limited Marking 3DR

While the above embodiments disclose (generally) the use of three (3) marking points per image from at least two different cine-angio runs, other embodiments of the invention may utilize less marking points. For example, in some embodiments, the operator may simply mark two (2) points per image for two cine-angio runs, or, in other embodiments, the operator may mark two (2) points for a first image from one cine-angio run and one (1) point for one or more additional images (from other cine-angio runs).

For example, an operator may mark two (2) points proximal and distal (to a stenosis) on one image of one cine-angio run. This run may be referred to as a "Master" run, and the selected corresponding image to a "Master" image. The system then calculates centerline and edges and a "stenosis" point on the artery (this point is not required to be the actual stenosis point, but, rather, a reference point). The operator then selects images from two additional runs (the "Slave" runs) and marks the location of the "stenosis" point on the images from the Slave runs. After reception of each stenosis point on the images from the Slave runs, the systems performs tracing on the image of the Slave runs, then presents the results of the trace and the 3DR. This reduction of markings may be enabled in embodiments of the present invention using path optimization algorithms including, for example, a generic dijkstra algorithm or a wave propagation algorithm (WPA) adopted for the image trace.

Thus, using a WPA, for example, after image, source point and target point are input, with respect to the Master image, a path is found connecting the source point and target point with minimal cost (e.g., sum of image gray levels to some power). For the images from the Slave runs, the target set is an epi-polar line, instead of point, and the result is a path connecting the source point ("stenosis" or anchor point) to the target line.

In addition, a tree of alternative paths may be produced and the optimal branch path may be chosen. This process is further explained as follows:

Trace Master image: proximal and distal points of a vessel of interest are input by an operator, and a centerline of the vessel of interest is produced (output). At this time, the system traces the edges of the vessel of interest in the Master image and determines the stenosis point (which may be accomplished, for example, by determining the location of the minimum diameter of the vessel of interest). The centerline is split into proximal and distal portions.

Thereafter, the images from the Slave runs are traced, separately for the proximal and distal portions, from the marked "stenosis" point to the epi-polar line, for both slave images. This produces 4 traces, with the output comprising one proximal and one distal path for every Slave image (main branches). Using a queue state at the end of dijkstra/WPA, additional candidate branches (secondary branches) may be added to the main branch. As a result, two proximal and two distal candidate trees for Slaves images are obtained.

A choice is then made on the optimal candidate combination: the optimal combination of proximal candidates and the optimal combination of distal candidates comprise three (3) primary centerlines. For every candidate branch combination (branch from Master image and two candidates from Slave images), a 3D match is performed with 3D deviation error attribution. The errors express a quality of the match and are sensitive to scale distortion. Additional criterion of the match quality is a match of 2D centerline directions at corresponding points of the three centerlines. This match criterion may be insensitive to the scale change between the images.

Accordingly, the aggregate criteria for the optimal combination is then selected based on the combination of deviation errors, direction match between the centerlines and an additional consideration of a preference to the combinations utilizing more points from the centerline of the Master image.

Second Group of Embodiments

It is an objective of this group of embodiments of the present invention to provide a method and system for three-dimensional reconstruction of a tubular organ from angiographic projections. Specifically, the second group of embodiments improve the epi-polar geometry approach for 3DR by providing additional considerations to the three-dimensional reconstruction process, thus providing accurate correspondences between different projections and thus providing an accurate 3D model even in the presence of the mentioned geometrical distortions and epi-polar problem condition.

The suggested reconstruction method, according to the second group of embodiments, is based on epi-polar geometry enhanced by integrating other considerations to the reconstruction process. These other considerations including, for example, the tubular organ's parameters derived from the image, such as Radius and Densitometry (Gray-level) values, along the tubular organ's centerline and local centerline directions. Other considerations, which are derived from the tubular organ's characteristics, can be also incorporated. The current group of embodiments provide a method for three-dimensional reconstruction from two two-dimensional angiographic images and a method for three-dimensional reconstruction from three or more two-dimensional angiographic images. These embodiments further provide a solution for three-dimensional reconstruction for the case where a common reference point between all two-dimensional images is given as well as for the case where the reference point is not given; in this case, a novel approach is provided for obtaining a reference point by means of correlating the invariant functions.

Accordingly, some of the embodiments according to this second group include a method for establishing correspondence between projections of a tubular organ visible in angiographic images comprises:

(a) extracting centerlines of the tubular organ on two angiographic images,
  (b) computing features along centerlines points: radius of the tubular organ, centerline direction, projected cross section area of the tubular organ (densitometry); these features compose invariant functions, which are used to match between centerlines,
  (c) constructing an optimization target function that comprises a penalty function expressing soft epi-polar constraint and discrepancies between invariant functions; the optimization's target function being defined over all possible correspondences between the two centerline points,
  (d) solving the optimization target function, to generate a map between 2D points on one centerline to the 2D points on the other centerline,
  (e) if a reference point is given, then optimizing solution so that the map includes the match of the reference point, (f) when a reference point is not given, finding it either by obeying the condition $E_1(i)=0$ and $E_2(j)=0$ where E is dP/dL, P is epi-polar distance and L is centerline length, or by means of finding the correlation of functions $S_1/E_1$ and $S_2/E_2$ expressed as functions of epi-polar distance to arbitrary temporary reference point or via correlation of functions $R_1$ and $R_2$;

whereby every matched set of 2D points defines a 3D point, for example as a point that minimizes distance from projective lines and the sequence of these 3D points is the three-dimensional reconstruction of the tubular organ.

In the case of three or more projections the optimization process is similar and a 3D point could be found by either:

a. "averaging" the 3D points that result from every pair of projection lines, or, b. using three or more projection lines to determine a 3D point; for example, a point that minimizes sum of distances from those lines.

Also, in the case of three or more projections, a direction correspondence criterion is incorporated into the optimization process. The process of finding the correlation could be performed prior to optimization or as part of the optimization.

Epi-polar principle defines that, given two 2D projections, every point on the first image defines an epi-polar line on the second image (and vice a versa); the 2D point on the second image that corresponds to the 2D point on the first image is restricted to this epi-polar line.

Three-dimensional reconstruction using epi-polar geometry could be described as follows:

(a) given 2D centerlines in two projections, each 2D point in the first centerline defines an epi-polar line that intersects the centerline of the second image, this intersection point is the 2D point on the second image that corresponds to the 2D point on the first image, (b) each of these 2D points defines a projective line (meaning a line from the source 3D point to this projected 2D point). Thus, the intersection of the two projective lines finds the corresponding 3D source point (Ideally two lines are intersecting, but in practice they do not, so criteria such as minimal distance point should be defined).

(c) the sequence of resultant 3D points is the three-dimensional reconstruction of the tubular organ.

This described process of three-dimensional reconstruction using epi-polar geometry has many insufficiencies. Accordingly, the second group of embodiments brings answers to these insufficiencies based on exploitation of additional invariants apart from epi-polar distance for obtaining accurate match between 2D projections of a tubular organ and 3D reconstruction. One invariant is the radius function behavior along the projected arteries. In the invention, a general relation also is established between projected density of the arteries and epi-polar geometry. The relation allows calculation of values invariant for different projections. The invariance property is utilized for matching tubular organs in different projections. It is known that even in the case where there are no distortions, there exist situations when the epi-polar principle does not supply the unique solution (the epi-polar ambiguity). The new approach according to the second group of embodiments aids in solving the ambiguity in such situations. The relation will be proved under the assumption of local cylinder structure of the tubular organ.

Defining an invariant function using epi-polar conditions and projected area (densitometry)

Figure 36:
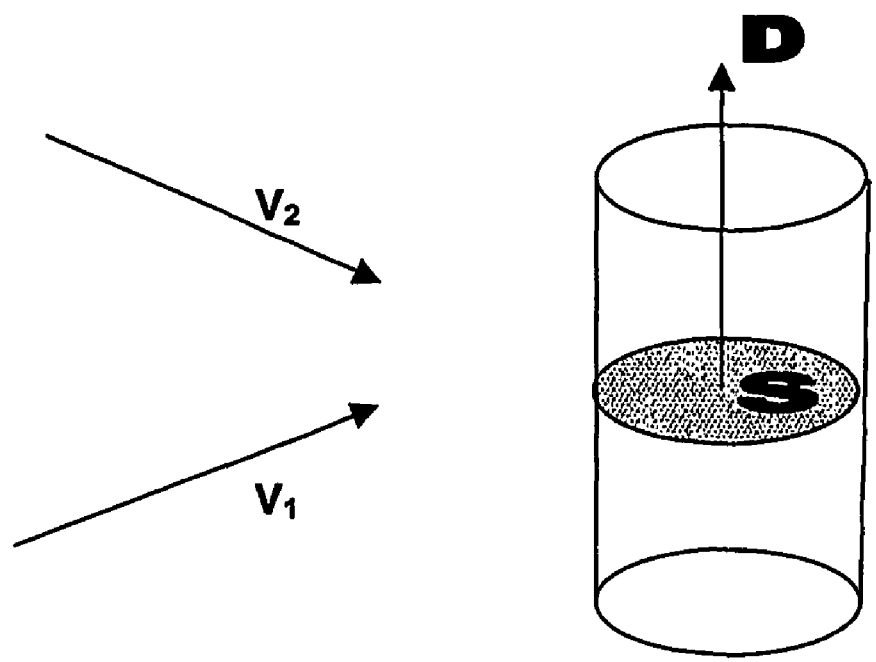
FIG. 36 illustrates a 3D cylinder representation of a tubular organ segment according to some embodiments of the present invention.
Figure 37:
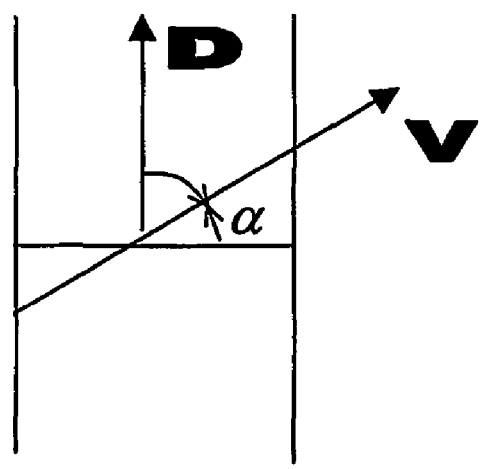
FIG. 37 illustrates a cross-section area through the segment illustrated in FIG. 36.

FIG. 36 shows 3D cylinder representation of a tubular organ segment. Let D be the 3D direction of the tubular organ and S be the area of cross section (FIG. 1) orthogonal to D, $|D|=1$. Let $V_1$ and $V_2$ be C-Arm directions in which two images of the tubular organ have been taken, $|V_1|=1$, $|V_2|=1$. The cross sectional area is equal to S only in the case when view direction is orthogonal to the tubular organ ($V_1$ orthogonal to D). In the general case the cross sectional area is inversely proportional to the cosine of the angle between the view direction V and the plane of orthogonal cross section S. This implies that the cross sectional area is S/cos ($\alpha$) (FIG. 37).

The above-mentioned cosine is equal to the sine of the angle between the vectors V and D. So, the cross sectional area is:

$$S_i = S\sqrt{1-(V_i^T D)^2}, \; i=1,2, \tag{1}$$

where $V_i^T D$ is a dot product of two vectors.

Let $D_1$ and $D_2$ be projections of the tubular organ's direction to the image planes. Directions $D_1$ and $D_2$ coincide with the tub directions. We have $$D_i = D - (V_i^T D) V_i, \; i=1,2. \tag{2}$$

Note, the vectors $D_1$ and $D_2$ in (2) are not normalized.

Denote by $V_{12}$ the unit vector orthogonal to two view vectors $V_{12} = V_1 \times V_2 / |V_1 \times V_2|$. The vector $V_{12}$ is the vector orthogonal to epi-polar planes of the two images. The measure of the projected orientation of the tubular organ relative to epi-polar plane E is, by definition, a scalar product of $V_{12}$ and the tubular organ's direction:

$$E_1 = D_1^T V_{12}/|D_1| \text{ and } E_2 = D_2^T V_{12}/|D_2|. \tag{3}$$

Theorem: the ratio of projected area and the visible epi-polar orientation is invariant for every pear of views, i.e.

$$S_1/E_1 = S_2/E_2. \tag{4}$$

Proof:

Using (1) and (2), we obtain:

$$S_1^2(1-(V_1^T D)^2) = S_2^2(1-(V_2^T D)^2) \tag{5}$$

$$D_1 + (V_1^T D)V_1 = D_2 + (V_2^T D)V_2. \tag{6}$$

Multiplying (6) by $V_{12}$ we obtain $D_1^T V_{12} = D_2^T V_{12}$ and using notation (3)

$$|D_1|E_1 = |D_2|E_2. \tag{7}$$

Raising (7) to the second power, we can rewrite it in the form $|D_1|^2 E_1^2 = |D_2|^2 E_2^2$. From (2) we obtain $|D_i|^2 = (D-(V_i^T D)V_i)^T (D-(V_i^T D)V_i) = 1-(V_i^T D)^2$. Hence, $$(1-(V_1^T D)^2)E_1^2 = (1-(V_2^T D)^2)E_2^2. \tag{8}$$

Using equations (8) and (5) we reach equation (4), thus, theorem is proven.

All the measures presented in equation (8) are calculated from the images and do not require 3D reconstruction. $S_i$ is known as densitometry—determining projected cross section area values using gray level values in the image. As mentioned, directions $D_1$ and $D_2$ can be calculated as directions tangential to the extracted 2D centerlines from the images.

Defining a novel constraint for the process of 3D reconstruction from three or more views In the case of three-dimensional reconstruction from three or more projections we can incorporate a direction correspondence constraint. Let $D_1, D_2, \ldots, D_N$ be vectors tangential to the 2D tubular organ's centerlines expressed as 3D vectors. The following condition is necessary for point match. For matched points the rank of matrix composed of vectors $D_1, D_2, \ldots, D_N$ is less then 3.

$$\text{Rank}(D_1, D_2, \ldots, D_N) < 3$$

For three projections (N=3) the equivalent statement is zero determinant of the matrix composed of the vectors $D_1, D_2, D_3$ $$\text{Det}(D_1, D_2, D_3) = 0.$$

Method for 3D reconstruction from 2D projections

For simplicity sake, the process will be described for two 2D projections. The process for three or more 2D projections is a simple generalization of the described. Parallel projection geometry is assumed and an image plane passing through 3D origin point that coincides with an identified or given reference point in every image is considered; thus, every point and direction found in the image plane can and will be expressed as 3D entities using reference point and known orientation.

Let $L_1(1), L_1(2), L_1(3), \ldots$ be a sequence of points representing the tubular organ's centerline in the first image and $L_2(1), L_2(2), L_2(3), \ldots$ be a sequence of points representing the tubular organ's centerline in the second image. Using previous notation, $V_1$ and $V_2$ are projection directions and $V_{12}$ is epi-polar direction orthogonal to two view vectors. Index i is used as an index of a point on line $L_1$ and j as index of point on line $L_2$. Let $R_1(i), R_2(j)$ be corresponding measures of radii from 2 projections, $D_1(i), D_2(j)$ measures of centerline normalized direction vectors and $S_1(i), S_2(j)$ measures of projected cross section areas based on densitometry calculation. Denote $P_1(i) = \text{dot}(L_1(i), V_{12})$, $P_2(j) = \text{dot}(L_2(j), V_{12})$ as epi-polar distances and $E_1(i) = \text{dot}(D_1(i), V_{12})$, $E_2(j) = \text{dot}(D_2(j), V_{12})$. An equivalent definition of E can be given via increments of epi-polar distance and line length $E = dP/dL$.

Consider a function F of two variables i and j defined on the rectangular domain of indexes ij: $(1 \leq i \leq N) \times (1 \leq j \leq M)$ where N and M are numbers of points in the centerlines.

$F(i,j) = F_1(|P_1(i) - P_2(j)|) + C_2 F_2(|R_1(i) - R_2(j)|) + C_3 F_3(|S_1(i)E_2(j) - S_2(j)E_1(i)|) + F_4(E_1(i)E_2(j))$. Here $F_1, F_2, F_3, F_4$ are functions with the following properties. $F_1(0) = F_2(0) = F_3(0) = 0$; $F_1, F_2, F_3$ are monotonically increasing functions; $F_1(\infty) = \infty$; $0 \leq F_2, F_3 \leq 1$;

$$F_4(x) = \begin{cases} 0, & \text{if } x \geq 0 \\ \infty, & \text{if } x < 0 \end{cases}$$

$C_2$ and $C_3$ are weight coefficients.

The matching problem is formulated as a solution to the minimal path finding problem for function F. Namely, find continuous and monotonic path starting on side i=1 or j=1 and ending on side i=N or j=M with minimal sum of values F on its way. The terms "continuous" and "monotonic" mean that there are three possible increments of indexes i,j: (0,1), (1,0),(1,1). The optimization problem can be solved by dynamic programming method or Dijkstra type algorithm.

The first term $F_1(|P_1(i) - P_2(j)|)$ of the target function is a soft epi-polar constraint that penalizes strong deviations from the epi-polar condition $P_1(i) = P_2(j)$. For example, the penalty function $F_1 = (|P_1 - P_2|/T)^2$ is tolerant for the discrepancies $|P_1 - P_2| < T$ and is severe for gross discrepancies $|P_1 - P_2| > T$. The second term $C_2 F_2(|R_1(i) - R_2(j)|)$ of the target function encourages similarity of radii along the optimal path. The third term $C_3 F_3(|S_1(i)E_2(j) - S_2(j)E_1(i)|)$ expresses invariance property stated in theorem. Here it is written in the form eliminating singularities associated with division by zero. The fourth term $F_4(E_1(i)E_2(j))$ actually imposes stiff constraint not allowing to match up the segments with opposite orientation though the epi-polar distance allows the match. This term often helps to resolve the matching in the situation of ambiguity (epi-polar problem). Formally, a requirement for the epi-polar orientation measure $E_1(i), E_2(j)$ to have the same sign follows from the equality stated in the theorem and the fact that the measured cross sectional area is always positive.

Thus, the optimization's target function F(i,j) is defined over all possible correspondences between the two centerline points; the solution of the optimization problem is a correspondence map between 2D points on one centerline and 2D points on the other centerline. Now, obtaining the three-dimensional reconstruction continues as known in literature: every matched set of 2D points defines a 3D point, for example as a point that minimizes distance from projective lines. The sequence of these 3D points is the three-dimensional reconstruction of the tubular organ.

In the case of three or more projections the optimization process is similar and a 3D point could be found by either:

(a) "averaging" the 3D points that result from every pair of projection lines, or, (b) using three or more projection lines to determine a 3D point; for example, a point that minimizes sum of distances from those lines.

Also, in the case of three or more projections, a direction correspondence criterion is incorporated into the optimization process, described above as "defining a novel constraint for the process of 3D reconstruction from three or more views".

If the reference point is one of the skeleton point, i.e. $L_1(i_0)$ and $L_2(j_0)$, an additional constraint forcing the optimization algorithm to path through the reference $i_0, j_0$ is imposed into the target function $$F_{ref}(i, j) = \begin{cases} \infty, & \text{if } (i = i_0 \text{ and } j \neq j_0) \text{ or } (i \neq i_0 \text{ and } j = j_0) \\ 0, & \text{otherwise} \end{cases}$$

Note that only one term in the target function depends on reference point—the penalty term $F_1(|P_1(i) - P_2(j)|)$.

When the reference point is not known, the difference of epi-polar distances can be described as one parameter family of functions depending on a shift along epi-polar direction. The reference point (or shift) can be found in different ways:

the reference point can be chosen among the points obeying the condition $E_1(i) = 0$ and $E_2(j) = 0$, where E is dP/dL, P is epi-polar distance and L is centerline length.

the shift and therefore reference point can be found via correlation of functions $S_1/E_1$ and $S_2/E_2$ expressed as functions of epi-polar distance to arbitrary temporary reference point or via correlation of functions $R_1$ and $R_2$.

the reference point can be found in the process of solving the optimization problem if the classical penalty term $F_1(|P_1(i) - P_2(j)|)$ is substituted with the following expression  $F_1(|P_1(i)-P_2(j)-(P_1(i_{start})-P_2(j_{start}))|)$, where $P_1$, $P_2$ are distance to arbitrary temporary reference point and $i_{start}$, $j_{start}$ are indexes of the first point of the currently optimal matching segment in the point (i,j).

In addition to the method described above, the invention also contemplates a system for imaging a tubular organ, comprising a microprocessor configured to generate a three-dimensional reconstruction of the tubular organ from two or more angiographic images of the tubular organ obtained from different perspectives, using the three-dimensional reconstruction method described above. The invention is particularly applicable to imaging an artery contained in an arterial tree.

Third Group of Embodiments

It is an object of the third group of embodiments of the present invention to provide a method and system for three-dimensional organ reconstruction from more than two angiographic projections in an automated manner, meaning without additional user interaction, i.e., without requiring the user to identify the tubular organ on additional angiograms.

A three-dimensional reconstruction of a tubular organ, such as an artery, from two projections is available via methods known in the prior art. Usually, this requires some user interaction to identify the organ of interest in the first two views. Once this reconstruction is available the third group of embodiments provides a method of an automated update on the basis of one or more additional projections. When a 3D model reconstructed from two projections is available, it is projected on to an additional image plane according to the specific viewing geometry of that additional existing projection. This gives rise to a major geometric distortion that manifest itself as an unknown shift between the actual X-Ray image and the projected model. The third group of embodiments may determines this shift by implementing a correlation technique. After the shift is calculated the organ tracing and analysis in the third image is carried out with the use of the projected model as a first approximation. The new detected and traced projection of the organ is then used for recalculation of the three-dimensional reconstruction to a better approximation.

According to a second aspect of this group of embodiments, the three-dimensional reconstruction made from two views is exploited to determine local weights for a refined reconstruction incorporating additional projections. A projection of an organ is most informative for the purpose of three-dimensional reconstruction when the viewing direction is orthogonal to the organ. In addition, a pair of projections is more informative when the viewing directions are sufficiently separated. These properties are obviously local, per segment of the organ. Thus, one combination of projections is preferable for one segment of the organ, while another combination of projections is preferable for another.

The third group of embodiments proposes to determine local weights of combination of two 2D image sources for refined 3D reconstruction. Local weights are determined according to the angle between the primary 3D model (reconstructed from the first two projections) centerline and view vectors of the projections and angle between the view vectors.

Accordingly, the third group of embodiments relates to a novel method and system for an automated three-dimensional reconstruction of an organ from three or more projections. Once a three-dimensional reconstruction of the organ from two projections is available, the present group of embodiments provides a method and system that performs an automatic identification of the reconstructed organ in the 2D image of an additional projection, performs an automatic trace and analysis of the organ in the 2D image (in the same manner as was performed on the first and second images), and finally incorporates the new projection into the three-dimensional reconstruction, improving the accuracy of the three-dimensional reconstruction. Such an approach is particularly applicable to imaging an artery contained in an arterial tree.

A projection of an organ is most informative for the purpose of three-dimensional reconstruction when the viewing direction is orthogonal to the organ, and substantially different views produce more accurate 3D reconstruction than not substantially different (close) views. To implement these two notions, some of the embodiments of this third group are directed to a novel method and system for exploiting the three-dimensional reconstruction made from two views to determine local weights for a refined reconstruction incorporating additional projections.

Specifically, the present group of embodiments relates to two aspects of making a better three-dimensional reconstruction of an organ when additional angiographic projections to a first two projections are available. The first aspect refers to an automated procedure of identifying, tracing and incorporating an additional projection into the reconstruction. The second aspect presents a novel method of weighted reconstruction process, where weights express the local optimal combination of projections to reconstruct the 3D model from, as a function of viewing angles.

Method for automatic detection of the organ in additional projection

Let A be a 3D model of an organ segment reconstructed from two marked images. For example, we can use a generalized cylinder model that consists of a three-dimensional centerline and circular orthogonal cross sections specified by radii. This model could be expressed as $A=(X_i, Y_i, Z_i, R_i)$, where i is the index for skeleton points along the three-dimensional centerline. Let I be an image that did not participate in reconstruction of A. Let G be the known geometry of image I. The geometry data G includes angles and rough estimation of magnification factor but does not include C-Arm patient bed shift. We are referring the 3D model A as floating, meaning, representing the true organ it terms of dimensions and morphology but not in terms of location in space.

Projection of the model A using geometry data G into image I plane could be done in two ways—binary or realistic. The "realistic" projection will set the gray value of a pixel as a function of the length of intersection between the ray and the model. The "binary" projection will simply set pixels as zeros and ones, where "one" means that there was an intersection between the ray and the model. For Finding the shift between the projected image and the angiographic image I, the two should be correlated, using correlation methods known in literature; correlation could be performed between I and either a "realistic" projected image or a "binary" projected image.

The shift defines a region of interest on image I, and the three-dimensional model projection provides a first approximation of the organ's centerline. Thus, the process continues by tracing the organ in image I, as known in the prior art, organ's parameters (radii, gray-levels . . . ) are computed, as known in the prior-art and eventually the data from this additional projection in incorporated into the three-dimensional reconstruction.

Method for Three-Dimensional Reconstruction from N (N>2) 2D Projections

Reconstruction of a 3D line from multiple projections can be posed as an optimization problem whose elementary step is reconstruction of a single point. Theoretically, reconstruction of a single point using multiple projections can be done by means of intersection of projective lines corresponding to the 2D projections; in practice, projective lines do not intersect. One natural definition for a 3D reconstructed point, resulting from intersecting two lines, could be definition the 3D point as the middle of the shortest segment connecting the projective lines. Three-dimensional reconstruction from three or more projections expands the above-mentioned idea and determines a 3D point in a similar way. One example is a direct expansion of taking the 3D point that minimizes distance from (three or more) projective lines. Another method is to take the 3D points that result from all pairs of projections and set the final reconstructed point as a geometrical function of these points. The present group of embodiments suggest a novel approach, in which the results from all pairs of projections are indeed used, but rather than setting the 3D reconstructed result as a function of only the points, the relationship between viewing angles and the 3D model is utilized to determine weights for each pair result.

Let $V_1, V_2, \ldots, V_N$ be viewing directions and $L_1, L_2, \ldots, L_N$ be projective lines, $L_i = P_i + \lambda V_i$, where $P_1, P_2, \ldots, P_N$ are points from 2D centerlines (i indexing a projection).

Let A be a 3D model of an organ segment reconstructed from two projections with indexes 1 and 2. We hold, as a result of a primary reconstruction from these two projections 1 and 2, a reference from points $P_1, P_2$ to the centerline points of the model A. Let T be a local tangent direction of the 3D model A at the region where points $P_1, P_2$ reference to. Let $R_{ij}$ be middle of the shortest segment between the projective lines $L_i, L_j$. Denote by $W_{ij} = \det(V_i, V_j, T)$ a determinant of 3-by-3 matrix composed of unit vectors $V_i, V_j$, and T. The intersection point is given by the expression:

$$R = \Sigma W_{ij} R_{ij} / \Sigma W_{ij}$$

The quality of intersection is:

$$D = \Sigma W_{ij} D_{ij} / \Sigma W_{ij},$$

Where $D_{ij}$ is distance between the lines $L_i, L_j$.

The reconstructed 3D point is defined as a weighted sum of the intersection points per each pair of projective lines. The weights reflect the mutual geometry of two views and local orientation of the primary 3D model in such a way that maximal weight (1) is achieved by the combination of two orthogonal views, which are also both orthogonal to the organ. The weight is near zero in the case when the two views are close to each other or if one of the views is too oblique. It is to be noted that the nature of the weights is local; the same pair of views can maximally contribute at one segment of the organ and minimally contribute at another segment. Note also that this suggested definition is quite efficient, since it does not require the calculation of 3D reconstructed points during the optimization process; the distance $D_{ij}$ between two projective lines is simply the discrepancy between epi-polar distances calculated as an absolute difference of two dot products.

In addition to the method described above, this third group of embodiments also contemplates a system for imaging of a tubular organ, comprising a processor configured to generate a three-dimensional reconstruction of the tubular organ from two or more angiographic images of the tubular organ obtained from different perspectives, using the three-dimensional reconstruction method described above.

Other Improvements

The above-described embodiments of the present invention (groups one, two and/or three) may include one or more of the following features, although each feature, on its own, may also comprise an independent embodiment.

Multiple data 3DR Image page: cross-section area graph and lesion analysis measurements (e.g., diameter data, C-ARM position, other reference data) may be displayed simultaneously to deliver the maximum relevant information in an optimal manner (see, for example, FIG. 31).

Pop up menu for various projections. A pop up list (3210, FIG. 32) presented in various projections (e.g., 2D projections, ONP and 0,0). Selection of any projection may rotate the 3D to that projection enabling the operator to appreciate it with comparison to the 2D images (for example).

Color coding of 3D model and/or graphs and other data. Color coding can be implemented to denote narrowing severity, angulation, etc. (or a combination of parameters), to draw the physician attention to problematic segments.

Correlated data. A cross-reference of data from a 2D trace of the vessel to the 3D model to graphs; every point can be allocated simultaneously on all. Cues are presented, for example to enable the operator to investigate the data either specifically or simultaneously.

Figure 34:
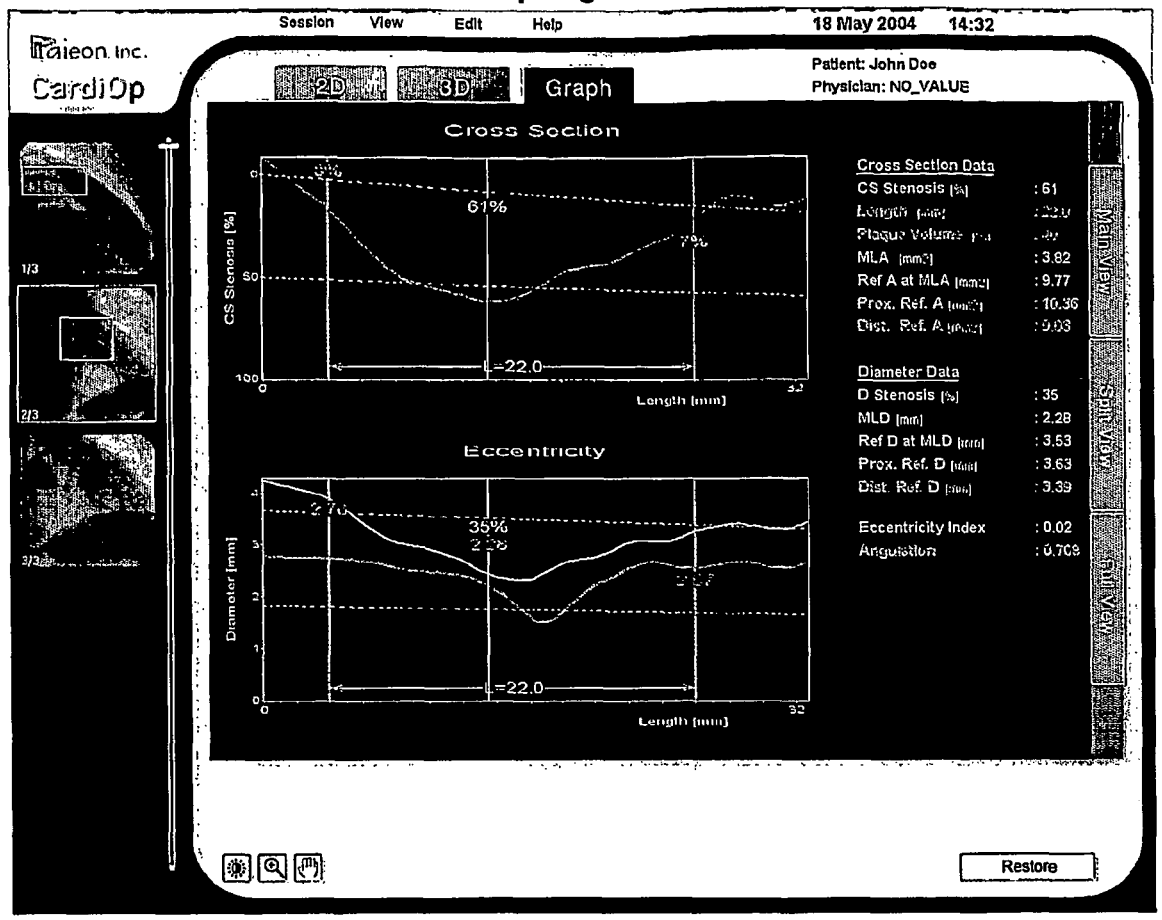
FIG. 34 is a screenshot for a 3DR system according to the present invention illustrating graphic data presentation.

One or more graphs (see, for example, screen shot, FIG. 34) may be presented including a graph for representing the cross-section area (fusion output) data and one for diameter information, or a combined graph. A diameter data graph may be referred to "eccentricity", as it presents maximum and minimum diameter value for every point along the vessel.

Epi-polar warnings/bars/lines. Epi-polar geometry is well-known and extensively documented, and is used for 3DR in the present invention However, a 3DR is only as good as the images are to prepare it. Accordingly, to determine whether a second image, in combination with the first image, is adequate to aid in 3DR, embodiments of the present invention provide an operator with a visual indicator. As shown in FIGS. 35A-35B, once the operator completes marking of a first image (FIG. 35A), and the vessel of interest is traced, as soon as the operator clicks on/about the stenosis on the second image (FIG. 35B), the system presents, on the second image, epi-lines (lines 3510 and 3520) that are in the vicinity of the first image's markings and epi-bar 3530.

The bar indicates the conditions for 3DR. In the present illustration (FIG. 35B), the bar is color coded to indicate whether the second image is a good combination with the first image. Here, the more "white" the bar is, the better the conditions for 3DR. Accordingly, since the bar in FIG. 35B is quite white, conditions are good for 3DR (a "redder" bar would indicate poorer conditions for 3DR).

Many of the figures represent screen-shots of a preferred embodiment of the system. Specifically it is presented a preferred embodiments of catheter calibration (FIG. 33), display of 2D image related data (FIG. 29), including edge tracing and healthy artery display, display of 3DR results (FIG. 31) of the vessel of interest and 3D healthy vessel, and quantitative analysis of the vessel of interest (FIG. 34) in the form of graphs and specific measurements, such as percent narrowing (diameter and area), length, plaque volume, minimal lumen diameter and area, reference (healthy) area and diameter measures, eccentricity index and angulation.

Having now described a number of embodiments of the present invention, it is apparent to those skilled in the art that the present disclosure is not limited to those embodiments, and that the above embodiments may be used in combination. Moreover, numerous other embodiments and modifications of the disclosed embodiment are contemplated as following within the scope of the present invention.

What is claimed is:

1. A method for three-dimensional reconstruction (3DR) of a single tubular organ using a plurality of two-dimensional images comprising:
   displaying on a display a first image of a vascular network, the first image captured by an imaging system;
   receiving input for identifying on the first image a vessel of interest;
   tracing the edges of the vessel of interest in the first image including eliminating false edges of objects visually adjacent to the vessel of interest;
   determining substantially precise radius and densitometry values along the vessel of interest in the first image;
   displaying on a display at least a second image of the vascular network, the second image captured by the imaging system;
   receiving input for identifying on the second image the vessel of interest;
   tracing the edges of the vessel of interest in the second image, including eliminating false edges of objects visually adjacent to the vessel of interest;
   determining substantially precise radius and densitometry values along the vessel of interest in the second image;
   determining a three dimensional reconstruction of the vessel of interest from the edges of the vessel of interest as traced from the first image and from the second image; and
   determining fused area measurements along the vessel from the substantially precise radius and densitometry values along the vessel of interest in the first image and in the second image.

2. The method according to claim 1, wherein the vessel of interest is selected from the group consisting of: an artery, a vein, a coronary artery, a carotid artery, a pulmonary artery, a renal artery, a hepatic artery, a femoral artery, a mesenteric artery, and any other tubular organ.

3. The method according to claim 1, further comprising determining a centerline of the vessel of interest, comprising a plurality of centerline points.

4. The method according to claim 1, wherein the fused area measurements are obtained using a fusion of diameter and cross section-densitometry derived measurements.

5. The method according to claim 1, wherein determining the fused area comprises:
   determine a plurality of healthy diameters along the vessel of interest to be used as a physical reference;
   normalizing a majority of the data, diameters and cross-section values to physical units, using the above physical reference; and
   fusing a majority of the data into single area measurements, weighting each source of data according to the reliability of the data.

6. The method according to claim 5, where weighting is computed as a function of the views geometry and/or 3D vessel geometry.

7. The method according to claim 1, wherein the input for identifying the vessel of interest comprises three points: a first point to mark the stenosis general location, a second point proximal to the stenosis, and a third point distal to the stenosis.

8. The method according to claim 1, wherein the input for identifying the vessel of interest comprises markers for two points for at least one of the first and second images, wherein one of the two points is anywhere proximal to the stenosis and the other point is anywhere distal to the stenosis.

9. The method according to claim 1, wherein the markers comprise two points for the first image and one point for the second image, wherein one of the two points is anywhere proximal to the stenosis and the other point is anywhere distal to the stenosis and wherein one point is an anchor point identified automatically on the first image.

10. The method according to claim 1, wherein elimination of false edges comprises ignoring one or more bubbles adjacent the vessel of interest.

11. The method according to claim 1, wherein elimination of false edges comprises:
    defining a region of interest substantially parallel to a primary centerline;
    detecting at least one cluster of pixel data, adjacent to the vessel of interest, wherein each cluster of pixel data having a predetermined brightness level greater than a brightness level of surrounding pixel data;
    selecting an arbitrary pixel within each cluster;
    selecting a second pixel provided on a lane bounding the region of interest for each arbitrary pixel of each cluster;
    establishing a barrier line to define an edge for the vessel of interest by connecting a plurality of arbitrary pixels with a corresponding second pixel, wherein upon the tracing each edge of the vessel of interest, the traced edge avoids each barrier line.

12. The method according to claim 1, wherein elimination of false edges comprises detecting and/or eliminating one or more bumps along the vessel of interest.

13. The method according to claim 1, wherein elimination of false edges includes:
    establishing a list of suspect points, comprising:
      establishing a plurality of first distances between each of a plurality of originating points on at least one preliminary traced edge and a corresponding closest point positioned along a primary centerline;
      establishing a plurality of second distances between each of a plurality of second centerline points point on the primary centerline to a corresponding closest point positioned on the at least one edge; and
      determining deviation from the primary centerline, as an absolute difference between the second distance and the first distance;
    determining a gradient cost function, inversely proportional to a gradient magnitude at each edge point;
    determining a combined function aggregating deviation from the primary centerline and the gradient cost function, wherein upon the combined function being greater than a predefined value, the corresponding edge point is determined to be a bump point in a bump;
    determining a bump area defined by a plurality of connected bump points and a cutting line adjacent the vessel of interest, wherein the cutting line comprises a line which substantially maximizes a ratio between the bump area and a power of a cutting line length; and
    cutting the bump from the edge at the cutting line to establish a final edge.

14. The method according to claim 3, wherein defining a centerline of the vessel of interest comprises:
- determining final traced edges of the vessel of interest;
- determining pairs of anchor points, wherein each pair comprises one point on each edge;
- determining a cross-sectional line by searching for pairs of anchor points which, when connected, establish the cross-sectional line substantially orthogonal to the center-line;
- dividing each edge into a plurality of segments using the anchor points, wherein for each segment, correspondence between the edges is established in that every point of each edge includes at least one pair of points on an opposite edge and a total sum of distances between adjacent points is minimal; and
- connecting the centers of the plurality of segments to determine the centerline.

15. The method according to claim 1, wherein determining densitometry values comprises subtracting a background influence.

16. The method according to claim 1, wherein determining densitometry values comprises:
- establishing a plurality of profile lines substantially parallel to at least one edge of the vessel of interest;
- establishing a parametric grid covering the vessel of interest and a neighboring region, wherein the parametric grid includes a first parameter of the vessel of interest along the length thereof and a second parameter for controlling a cross-wise change of the vessel of interest;
- sampling the image using the grid to obtain a plurality of corresponding gray values, wherein:
  - the gray values are investigated as functions on the profile lines;
- substantially eliminating detected occluding structures on the outside of the vessel of interest, the structures being detected as prominent minima of the parameters;
- substantially eliminating prominent minima detected on the inside of the vessel of interest;
- averaging gray values in a direction across the vessel of interest separately for each side of the vessel of interest;
- determining a linear background estimation on the grid inside the vessel of interest; and
- determining cross-sectional area using the eliminated prominent minima.

17. The method according to claim 1, further comprising determining healthy vessel dimensions using an iterative regression over a healthy portion of the vessel of interest.

18. The method according to claim 17, wherein each iteration comprises a compromise between a pre-defined slope and a line that follows healthy data.

19. The method according to claim 3, wherein determining the three-dimensional reconstruction of the vessel of interest includes:
- determining a conventional epi-polar distance $p_1$ for the plurality of centerline points in the first image;
- determining a conventional epi-polar distance $P_2$ for the plurality of centerline points in the second image; and
- re-determining $p_2$ substantially in accordance with $P_{2new} = P_2 + \delta$, where $\delta$ is a smooth compensatory function establishing correspondence of one or more landmark points.

20. The method according to claim 1, further comprising displaying quantitative analysis of the vessel of interest including cross-section area graph and/or lesion analysis measurements.

21. A system for three-dimensional reconstruction (3DR) of a single blood vessel using a plurality of two-dimensional images comprising:
- a display for displaying a first image of a vascular network and a second image of a vascular network, and a three-dimensional reconstruction of a vessel;
- input means for receiving input for identifying a vessel of interest on the first image and for identifying the vessel of interest on the second image;
- a processor configured with one or more application programs comprising computer instructions for:
  - tracing the edges of the vessel of interest in the first image including eliminating false edges of objects visually adjacent to the vessel of interest;
  - determining substantially precise radius and densitometry values along the vessel in the first image;
  - tracing the edges of the vessel of interest in the second image, including eliminating false edges of objects visually adjacent to the vessel of interest;
  - determining substantially precise radius and densitometry values along the vessel of interest in the second image;
  - determining a three dimensional reconstruction of the vessel of interest from the edges of the vessel of interest as traced from the first image and from the second image; and
  - determining fused area measurements along the vessel from the substantially precise radius and densitometry values along the vessel of interest in the first image and in the second image.

22. The method of claim 1 wherein tracing the edges of the vessel of interest in the first and the second images is performed for longitudinal edges.

23. The method of claim 1 wherein the vessel of interest is an artery vessel subject to a cardiac cycle or a respiration cycle, and wherein the first and the second images are obtained during the same phase of a cardiac cycle or a respiration cycle.

* * * * *